United States Patent
Nayak et al.

(10) Patent No.: US 9,455,927 B1
(45) Date of Patent: Sep. 27, 2016

(54) METHODS AND APPARATUS FOR BANDWIDTH MANAGEMENT IN A TELECOMMUNICATIONS SYSTEM

(71) Applicant: Sonus Networks Inc., Westford, MA (US)

(72) Inventors: Subhransu S Nayak, Nashua, NH (US); Mark Duffy, Lexington, MA (US); Tolga Asveren, Bordentown, NJ (US); Shiping Li, Acton, MA (US); Kevin Pilotte, Londonderry, NJ (US)

(73) Assignee: SONUS NETWORKS, INC., Westford, MA (US)

( * ) Notice: Subject to any disclaimer, the term of this patent is extended or adjusted under 35 U.S.C. 154(b) by 152 days.

(21) Appl. No.: 14/061,330

(22) Filed: Oct. 23, 2013

Related U.S. Application Data

(60) Provisional application No. 61/718,640, filed on Oct. 25, 2012.

(51) Int. Cl.
| | |
|---|---|
| *H04L 12/873* | (2013.01) |
| *H04L 12/911* | (2013.01) |
| *H04L 12/853* | (2013.01) |
| *H04L 29/06* | (2006.01) |
| *H04L 12/801* | (2013.01) |

(52) U.S. Cl.
CPC ......... *H04L 47/522* (2013.01); *H04L 47/2416* (2013.01); *H04L 47/70* (2013.01); *H04L 47/10* (2013.01); *H04L 69/14* (2013.01)

(58) Field of Classification Search
CPC ............. H04L 5/0064; H04L 12/2439; H04L 41/0896; H04L 47/50; H04L 47/52; H04L 47/522; H04L 47/525; H04L 47/10; H04L 47/521; H04L 47/70; H04L 47/74; H04L 47/741; H04L 47/78; H04L 47/2416; H04L 47/801; H04W 72/00; H04W 72/04; H04W 72/12
See application file for complete search history.

(56) References Cited

U.S. PATENT DOCUMENTS

| | | | |
|---|---|---|---|
| 7,065,048 B1* | 6/2006 | Levy | H04L 12/5695 370/230 |
| 7,388,837 B1 | 6/2008 | St-Denis et al. | |
| 2003/0028656 A1* | 2/2003 | Babka | H04L 12/5693 709/229 |
| 2003/0103520 A1* | 6/2003 | Chen | H04L 12/5695 370/444 |
| 2003/0185214 A1* | 10/2003 | Yang | H04L 12/5693 370/395.4 |
| 2003/0189943 A1* | 10/2003 | Gorti | H04L 12/5693 370/412 |
| 2003/0200317 A1* | 10/2003 | Zeitak | H04W 16/02 709/226 |
| 2008/0192632 A1* | 8/2008 | Bader | H04L 12/5695 370/230.1 |

* cited by examiner

*Primary Examiner* — Paul H Masur
*Assistant Examiner* — Kabir Jahangir
(74) *Attorney, Agent, or Firm* — Stephen T. Straub; Ronald P. Straub; Michael P. Straub

(57) ABSTRACT

Methods and apparatus for sharing bandwidth over a link in a packet-oriented telecommunications system or network that supports multiple types of traffic including, e.g., real time packet flows, opportunistic rate packet flows, control and signaling traffic, are described. In one exemplary embodiment the method includes the steps of receiving a bandwidth allocation request requesting allocation of a required amount of bandwidth for a new real time packet flow, allocating the requested bandwidth from bandwidth reserved for newly-allocated real time packet flows, updating the measure of the total amount of bandwidth allocated to real time packet flows to reflect the allocation of the bandwidth to the new real time packet flow, and generating new bandwidth allocations for existing opportunistic rate packet flows based on a measure of the total amount of bandwidth allocated to real time packet flows. Some embodiments of the invention include methods to enforce the dynamic bandwidth allocations.

18 Claims, 12 Drawing Sheets

BANDWIDTH ALLOCATION SCHEME

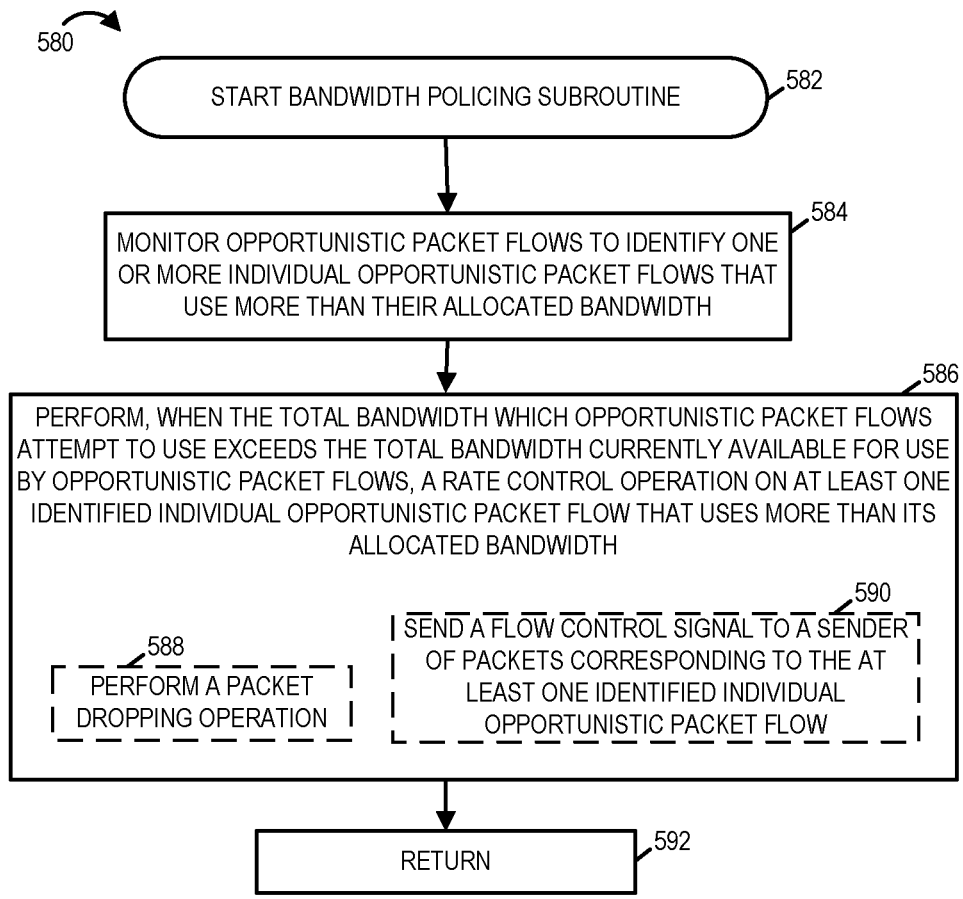

METHODS AND APPARATUS FOR BANDWIDTH MANAGEMENT IN A TELECOMMUNICATIONS SYSTEM

RELATED APPLICATIONS

The present application claims the benefit of U.S. Provisional Patent Application Ser. No. 61/718,640 filed Oct. 25, 2012, entitled "METHODS AND APPARATUS FOR BANDWIDTH MANAGEMENT IN A TELECOMMUNICATIONS SYSTEM", which is hereby expressly incorporated by reference in its entirety.

FIELD OF INVENTION

The present invention relates to methods and apparatus for bandwidth management in packet-oriented telecommunications systems and/or networks.

BACKGROUND OF THE INVENTION

The fixed and limited amount of bandwidth, i.e. capacity, on a telecommunications or network link make it generally necessary to have a bandwidth allocation and enforcement strategy to maximize the use of this limited resource. In packet-oriented telecommunications systems or networks, the data traffic to be transmitted on a link is packetized and transmitted as data packet flows. The data traffic is typically classified so that in those instances where there is insufficient bandwidth on the link to satisfy all requests for bandwidth, the requests for bandwidth can be prioritized and the limited amount of link bandwidth available allocated based on the data traffic's classification. Data traffic can be classified in a variety of ways and classification can be based on a variety of parameters. Exemplary traffic classifications include real time traffic and opportunistic rate traffic as discussed further below. Because link bandwidth is a limited resource, it is beneficial to be able to share a link's bandwidth for use by multiple classifications of traffic instead of apportioning the bandwidth so that portions of the bandwidth are reserved for use by only one classification of traffic. The sharing of bandwidth avoids the under utilization of the link's bandwidth in those instances where the amount of bandwidth reserved for a particular classification of traffic exceeds the amount of bandwidth necessary to satisfy all outstanding requests for traffic within that classification on the link. Instead of the reserved bandwidth remaining unused in such situations, the reserved bandwidth can instead be allocated for use to satisfy outstanding requests for bandwidth for traffic with a different classification.

Packet-oriented telecommunications or networking equipment such as Session Border Controllers, in some instances, use shared transmission resources such as link bandwidth to carry both real time traffic as well as opportunistic rate traffic. Real time traffic such as, for example, Real-time Transport Protocol (RTP) messages is typically characterized by having bounded end-to-end delay and jitter requirements. Real time traffic is also sometimes characterized as having known bit rates. Examples of real-time traffic include streaming of media, e.g., telephony, video teleconferencing, and interactive data. Opportunistic rate traffic, also sometimes referred to as best effort rate traffic, is sometimes characterized as being data traffic with unspecified bit-rates such as, for example, file data transfer traffic. Another example of opportunistic rate traffic is Message Session Relay Protocol (MSRP) messages carried over a Transmission Control Protocol (TCP) connection.

Packet flow is the flow of traffic. Packet flows corresponding to opportunistic rate traffic are referred to as opportunistic rate packet flows while packet flows corresponding to real time traffic are referred to as real time packet flows.

Real-time Transport Protocol (RTP) was developed by the Audio-Video Transport Working Group of the Internet Engineering Task Force (IETF) and first published in 1996 as RFC 1889, superseded by RFC 3550 in 2003. The Real-time Transport Protocol was designed to address real-time audio and video streaming of data over Internet Protocol networks which require timely delivery of information. It is used in Voice over Internet Protocol (VOIP) applications. The Real-time Transport Protocol achieves this objective through the use of standardized packet format messages. The RTP standard describes a data transfer protocol designed for use in the end-to-end transfer of real time data, a control protocol used to specify quality of service (QoS) feedback and synchronization between media streams, and optional signaling protocols such as Session Initiation Protocol (SIP), and an optional media description protocol such as Session Description Protocol (SDP). Exemplary transport protocols used for real time traffic include User Datagram Protocol (UDP), Transmission Control Protocol (TCP), and Stream Control Transmission Protocol (SCTP). UDP is the most common transport protocol for real time traffic. RTP sessions are used to support the transfer of real time data with one session for each stream.

Internet Engineering Task Force Request For Comment 4975 (IETF RFC 4975) defines the Message Session Relay Protocol (MSRP) for transmitting a series of related messages in the context of a communication session. An MSRP session is setup by using a rendezvous protocol, such as the Session Initiation Protocol (SIP) discussed above. Once the session is setup, MSRP messages are exchanged according to negotiated session parameters to carry session-oriented data, such as chat messages or file transfers. SIP messages which are used to setup the session carry control and signaling information. Session Description Protocol (SDP) is used to carry information about MSRP receipt addresses for each party. Exemplary transport protocols used for opportunistic rate traffic such as MSRP messages include User Datagram Protocol (UDP), Transmission Control Protocol (TCP), and Stream Control Transmission Protocol (SCTP). The Transmission Control Protocol is widely used for opportunistic rate traffic as it favors reliability over timeliness.

Link bandwidth on a network or telecommunications device may be, and often is, shared by real time traffic such as RTP carrying audio and video data, opportunistic rate traffic such as MSRP carrying file transfer data, and control and signaling messages. A session border controller that forwards real-time media and interactive data is one such device. Because of the varied bandwidth requirements of real time traffic, opportunistic rate traffic, and control and signaling traffic, it is quite challenging and difficult to reserve and allocate the proper amount of bandwidth to satisfy the needs of the various incoming data packet streams' bandwidth requests. For example, while the RTP traffic has a bounded end to end delay and jitter requirements, the MSRP traffic does not have a fixed bandwidth requirement and even the maximum expected bandwidth usage for a MSRP session is unknown. This makes it quite difficult to reserve resources and to decide whether a new MSRP session request should be accepted or rejected. In addition, the total bandwidth used by a set of MSRP sessions could vary significantly. This variation can potentially affect the committed bandwidth for RTP media sessions, which in turn affects the quality of voice and video payload carried within RTP flows. Moreover, attempting to optimize the use of a link's bandwidth through bandwidth sharing can lead to additional problems and difficulties in how to control, police, and/or enforce bandwidth allocation and usage policies.

From the above discussion it should be appreciated that there is a need for bandwidth management in packet-oriented telecommunications systems and/or network equipment that use shared transmission bandwidth to carry different classes of traffic such as real time traffic as well as opportunistic rate traffic. While known attempts to address these needs have obtained some level of success there remains a need for new and improved methods and apparatus for bandwidth management in packet-oriented telecommunications systems and/or networks.

SUMMARY OF THE INVENTION

The present invention relates to methods and apparatus for bandwidth management in packet-oriented telecommunications systems and/or networks e.g., which support both real time and opportunistic rate traffic, e.g., packet flows.

In accordance with one aspect of the invention, bandwidth is reserved for the admission of new real time traffic flows. When bandwidth is allocated to a new real time packet flow, e.g., in response to a bandwidth allocation request associated with establishment of a video or audio session, the allocation is made from the bandwidth reserved for the admission of new real time traffic flows.

While some, e.g., a relatively small amount of bandwidth is reserved for the admission of new real time traffic flows, other bandwidth is designated as being available for allocation to real time traffic flows. The total amount of bandwidth which is allocatable to real time traffic flows, excluding the amount reserved for the admission of new real time traffic flows, serves as a maximum real time packet flow bandwidth constraint in various embodiments.

In order to provide for efficient use of bandwidth in the system, when the amount of bandwidth allocated to real time traffic flows is less than the maximum real time packet flow bandwidth constraint, the unused bandwidth which may be allocated to real time traffic flows is allocated to opportunistic rate traffic flows. The opportunistic rate traffic flows however are precluded from using the bandwidth reserved for newly admitted real time traffic flows even if this bandwidth is not currently being used.

Since opportunistic rate traffic flows can use, e.g., take advantage of, the majority of bandwidth available for allocation to real time traffic flows when it is not allocated to an ongoing real time traffic flow, bandwidth utilization in the system is relatively high as compared to systems where bandwidth is dedicated to the exclusive use of real time traffic flows to the exclusion of other traffic flows.

Opportunistic rate traffic flows, e.g., best effort traffic flows such as MSRP using TCP packet flows, often implement rate control mechanisms which take time to reduce the rate of the packet flow from the sender. Opportunistic flow control mechanisms include, e.g., signaling indicating a change in the buffer size of the receiving device and/or the dropping of packets by the receiving device. In the case of a signal sent from a receiving device such as a session border controller implementing the methods described herein, indicating a reduction in the size of the receive buffer available for a flow, the sender will normally reduce the packet transmission rate thereby reducing the amount of bandwidth required by the opportunistic flow to which the buffer size message corresponds. Unfortunately, there is normally a delay between the time the buffer size message is sent and the time it is received and acted upon by the sender device. The dropping of packets corresponding to a flow will also normally result in a sender of an opportunistic rate traffic flow reducing its packet transmission rate and thus the bandwidth required for a particular flow. Unfortunately, the sender often takes some time to detect the dropping of packets, e.g., to detect the failure to receive an expected transmission acknowledgement or detect requests for packet retransmission from a sender which did not receive an expected packet.

The dropping of a large number of packets pending rate control functions corresponding to an opportunistic rate traffic flow taking effect, e.g., to make room for a new real time traffic flow, can have undesirable effects on the opportunistic rate traffic flows and place excessive short term burdens on the packet dropping mechanisms of a packet policer used to implement bandwidth allocations. Such disadvantages are reduced and/or avoided in accordance with the present invention by using the bandwidth reserved for newly admitted real time traffic flows to allow the newly admitted real time traffic flows to proceed without delay while also providing time for application of rate control to opportunistic rate traffic flows to take effect, e.g., in a relatively gradual and graceful manner so as to avoid shocks to the opportunistic rate traffic flows using the system and/or the packet policing mechanism being employed.

The methods and apparatus of the present invention can be used to control bandwidth sharing over a link which receives flows from different sources and/or corresponding to different applications. For example, the methods and apparatus may be used to control bandwidth sharing on an output link having various inputs.

In other cases, the bandwidth sharing mechanism can be applied to an input link which is used to supply packets corresponding to different flows to, e.g., a session border controller which may perform flow aggregation, packet policing and/or other functions.

It should be appreciated that some aspects of the present invention, i.e., reserving bandwidth for new packet flows, reduces and/or avoids the risk of congestion on a link, e.g., an input link, which would preclude allowing a new real time packet flow, where the packet dropping and/or rate control signaling may take time to have the desired effect on one or more devices sending packets, e.g., to a border controller implementing the invention, for forwarding. The methods and reservation of bandwidth for allocation to new real time packet flows can be particularly beneficial in cases wherein the constraint on the bandwidth of the inputs from which data packets are being received is equal to or greater than the bandwidth constraint on the link whose bandwidth is being shared in accordance with the invention. In such cases, without management of the flows, under certain conditions opportunistic packet flows may congest and/or fully occupy the input link(s) interfering with initiation of real time packet flows. By constraining the utilization of a link to reserve bandwidth for one or more new real time flows, the rate control mechanism is likely to increase the chance that the dropping of packets and/or flow control signaling will increase the probability that the load from one or more inputs will be slightly below that of the link being shared during steady state conditions such that there will be capacity on the link being shared to allow for the introduction of a new real time traffic flow.

Consider, for example a system where an input link has the same bandwidth capacity as an output link, the input link can become congested such that it does not have sufficient bandwidth to accommodate a new real time packet flow even though the packet forwarding device, e.g., session border controller, could create capacity on the output link for the new real time packet flow by dropping packets received on the input link. In such an instance, the dropping of packets received on the input link does not immediately relieve the congestion on the input link and the input link may remain too congested to carry a new real time packet flow until the packet dropping and/or other rate control signals are communicated to the sender(s) of the packets on the input link and the senders have time to respond. In such situations where an input link is fully utilized, a new real time packet flow cannot be initiated until the sender of the packets determines based on the dropping of packets that the rate of sending packets is to be reduced thereby providing additional bandwidth on the input link. Similarly, when rate reduction control messages are sent to the sender it still takes time for the sender to adjust the rate of transmission of packets and thereby free up bandwidth on the input link for the new real time packet flow.

By reserving a portion of the input link's or output link's bandwidth which is being managed for new real time packet flows, the link being managed will not be utilizing all of its bandwidth under steady state conditions thereby providing at least some bandwidth for assignment to a new real time traffic flow. Consider that by reserving bandwidth on an output link, bandwidth is also likely to be indirectly reserved on a corresponding input link or set of input links used to supply packets for transmission on an output link, e.g., by the normal rate control feedback mechanisms which regulate the senders' transmission of packets, and the input link is likely to have bandwidth available to support a new real time packet flow. In such instances, when the decision is made as to whether a new real time packet flow can be accommodated the answer will normally be an affirmative one.

Accordingly, it should be appreciated that a system using the methods and apparatus directly on an input link which receives packet flows from multiple sources to control the sharing of bandwidth on the input link or applies the methods to an output link which receives flows from multiple sources, e.g., over one or more input links and thus operates to reserve capacity on the input link via dropping of packet and/or other actions on the output link, is more likely to have capacity both on the input and output links to support immediately adding a real time packet flow than systems which do not work to reserve some bandwidth for the admission of one or more new real time packet flows.

As should be appreciated real time traffic flows such as voice and/or video transmission often require relatively fixed and predictable amounts of bandwidth to support a suitable level of Quality of Service (QoS). The amount of bandwidth required for a real time traffic flow is normally known at session establishment time. In order to ensure satisfactory support for real time traffic flows can be provided, a mechanism should be utilized to ensure adequate bandwidth availability. If there is an insufficient amount of bandwidth available to enable the flow to proceed at the time a session is being established, the session may be denied.

In accordance with various aspects of the present invention, a flow admission decision, e.g., a request to admit a new real time traffic flow, e.g., corresponding to a new video or voice session, is made based on the amount of bandwidth already allocated to real time traffic flows at the time of the flow admission decision, e.g., at session establishment, taking into consideration a predetermined total amount of bandwidth that is designated as being allocatable to real time traffic flows. If the amount of bandwidth required by a new real time traffic flow, as indicated in a bandwidth allocation request, is less than the difference between the predetermined total amount of bandwidth that is designated as being allocatable to real time traffic flows and the amount of bandwidth currently allocated to real time traffic flows, bandwidth is allocated to the new real time traffic flow in response to the bandwidth allocation request.

The bandwidth allocation to the new real time traffic flow is made from the bandwidth reserved for newly admitted real time traffic flows. The bandwidth is then replenished by the application of one or more rate control mechanisms to one or more opportunistic rate traffic flows.

In addition to the use of reserved bandwidth for allocation to real time traffic flows, various features relate to re-allocation of bandwidth among opportunistic rate traffic flows and various packet flow policing mechanisms used to perform packet flow rate control as needed to insure compliance with bandwidth allocations.

Numerous additional features and embodiments are described in the detailed description which follows.

DETAILED DESCRIPTION

Figure 1:
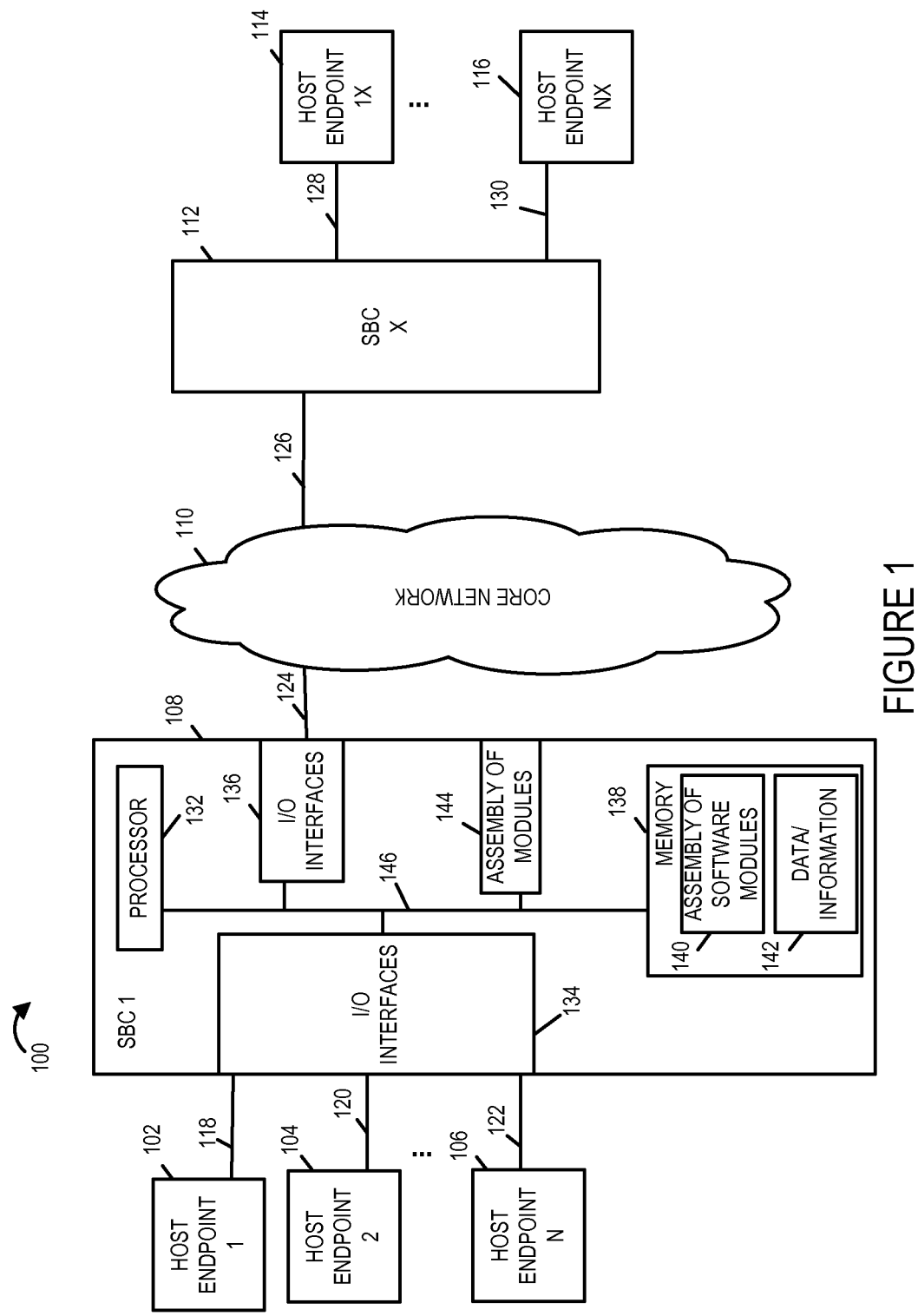
FIG. 1 illustrates an exemplary system 100 implemented in accordance with an exemplary embodiment of the invention.

FIG. 1 illustrates an exemplary system 100 implemented in accordance with an exemplary embodiment of the invention. System 100 includes a plurality of host devices also referred to as end points (host end point 1 102, host end point 2 104, . . . , host end point N 106) which are coupled to a session border controller 1 (SBC 1) 108 through links (118, 120, . . . , 122) respectively. SBC 1 108 is coupled to a core network 110 via link 124. Additional links may also be used to connected SBC 1 108 to the core network 110. System 100 further includes a second session border controller, SBC X 112, which is coupled to the core network 110 via link 126. Additional links may also be used to connect SBC X 112 and the core network 110. SBC X 112 is also coupled to a plurality of host device end points (host endpoint 1X 114, . . . , host endpoint NX 116) via links (128, . . . , 130), respectively. The core network 110 may include one or more network elements. The session border controllers SBC 1 108 and SBC X 112 are packet-oriented networking equipment that use shared transmission resources to carry both real time traffic, i.e. real time packet flows, as well as opportunistic rate traffic, i.e., opportunistic rate packet flows. Exemplary session border controller SBC 1 includes a processor 132, Input/Output (I/O) interfaces 134, I/O Interfaces 136, memory 138, and assembly of modules 144 coupled together via bus 146 through which the various elements can communicate with one another. SBC 1 108 uses its Input/Output Interfaces (I/O Interfaces) 134 for communicating with host end points (host end point 1 102, host end point 2 104, . . . , host endpoint N 106) via communication links (118, 120, . . . , 122), respectively. SBC 1 108 uses I/O Interfaces 136 for communicating with the core network 110 via link 124. Assembly of modules 144 perform various operations. Processor 132, assembly of modules 144, memory 138 and I/O Interfaces 134 and 136 are coupled to communication bus 146 through which they can communicate. Memory 138 includes an assembly of software modules 140, e.g., routines, and data/information 142. Processor 132 may execute routines in assembly of software modules 140 and use data/information 142 to implement steps of an exemplary method.

Figure 2:
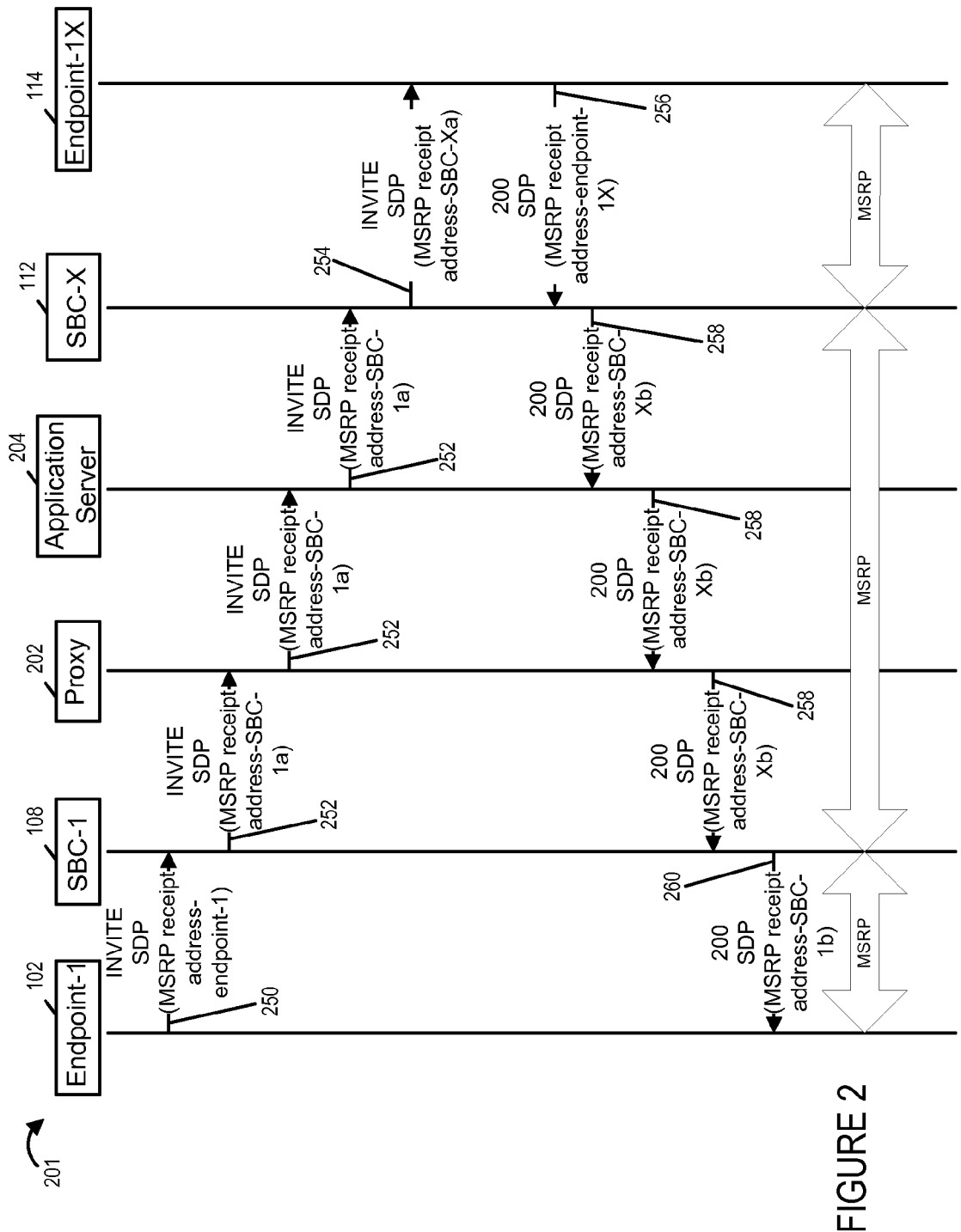
FIG. 2 illustrates an exemplary Message Session Relay Protocol session setup and message exchange.

As previously explained, MSRP messages used in a communication session are an example of opportunistic rate traffic that does not have end-to-end delay requirements. Diagram 201 of FIG. 2 illustrates an exemplary MSRP session setup and the entities and MSRP message exchange associated therewith. SIP messages which are used to setup the session traverse each of the SIP signaling entities, which perform some processing at the signaling level. The Session Description Protocol (SDP) carries information about MSRP receipt addresses for each party. A message INVITE is sent from Endpoint-1 102 to Endpoint-1X 114. Endpoint-1 102 first sends the INVITE message 250 to session border controller SBC-1 108. The message's address is modified by SBC-1 108 which forwards the modified message 252 to proxy 202 which forwards the message 252 to application server 204. The message 252 is forwarded from the application server 204 to SBC-X 112 which modifies the message's address and forwards the modified INVITE message 254 to Endpoint-1X 114. Endpoint-1X 114 sends a response message to Endpoint-1 102 as shown in diagram 201. Endpoint-1X 114 sends a response message 256 to SBC-X which modifies the address and forwards the modified response message 258 to the Application Server 204 which forwards the response message 258 to proxy 202. Proxy 202 forwards the response message 258 to SBC-1 108 which modifies the address and forwards the modified response message 260 to Endpoint-1 102. The Session Border Controllers SBC-1 108 and SBC-X 112 modify the addresses advertised in the Session Description Protocol (SDP) so that they may receive and relay the MSRP messages. In this example, an Application Server is not directly involved in the receipt and relay of the MSRP messages. The bandwidth needed to support the MSRP communication session setup in diagram 201 unlike real time data communication sessions is unknown when the session is established making it difficult to determine the appropriate amount of bandwidth to be allocated for the session.

In the methods and apparatus of the present invention, a portion of link bandwidth is reserved for use in responding to requests for bandwidth to support new real time packet flows. The use of this reserved bandwidth for newly allocated real time packet flows permits for the efficient sharing of a portion of the total link bandwidth so that the shared bandwidth may be used for both real time and opportunistic rate packet flows while providing a transition period during which bandwidth currently in use may be gracefully reallocated with a reduced amount of disruption to the opportunistic rate packet flows currently using the bandwidth. In one embodiment of the present invention, this is achieved by replenishing the reserved bandwidth each time it is allocated to support a new real time packet flow with bandwidth currently in use for opportunistic rate packet flows for example by reducing each of the currently existing opportunistic rate packet flows bandwidth allocation by the total amount of new bandwidth allocated for the new real time packet flow divided by the number of opportunistic rate packet flows currently in existence. In this example, no opportunistic rate packet flow or flows need to be terminated to accommodate the bandwidth allocation request needed to support the real time packet flow. With the use of the reserved bandwidth for new real time packet flows, the disruption to existing packet flows is minimized and an orderly and graceful reallocation of link bandwidth is effectuated. An exemplary bandwidth allocation scheme in accordance with some embodiments of the present invention is discussed in connection with FIG. 3 below. The bandwidth allocation scheme described in FIG. 3 can be used to control the allocation of bandwidth on an input link or an output link.

Bandwidth is the rate of data transfer over a communication path sometimes referred to as the maximum throughput or capacity of the communication path. Bandwidth may be expressed as various bit rates, e.g., in absolute bits/sec. Link bandwidth is the rate of data transfer or the maximum throughput a link can support. In the exemplary embodiment, the link bandwidth of a network node such as the session border controllers of FIG. 1 is a shared resource. In session border controllers such as SBC-1 108 of FIG. 1, the link bandwidth of link 124 which couples SBC-1 108 to the core network 110 is shared between real time traffic, e.g., RTP, carrying for example voice and video data; opportunistic rate traffic, e.g., non-real time media traffic such as Message Session Relay Protocol messages over TCP; and control and signaling traffic carrying control and signaling messages such as SIP.

From a bandwidth allocation perspective, data traffic in the exemplary embodiment is categorized into the following three classifications. First, there is real time traffic with bounded end-to-end delay and jitter requirements such as RTP traffic carrying voice and video. The bandwidth requested for a real time packet flow to be honored typically requires the allocation of the requested amount. Second, there is opportunistic rate traffic such as MSRP messages carried over TCP. The bandwidth allocated to an opportunistic rate packet flow can be lower than the requested amount. And, third there is control and signaling traffic which are packet flows that contain control and signaling messages typically used to set up media flows. A statically configured amount of bandwidth can be, and in some embodiments of the present invention is, reserved for such traffic. The bandwidth reserved for control and signaling messages is not available for use by media flows.

Figure 3:
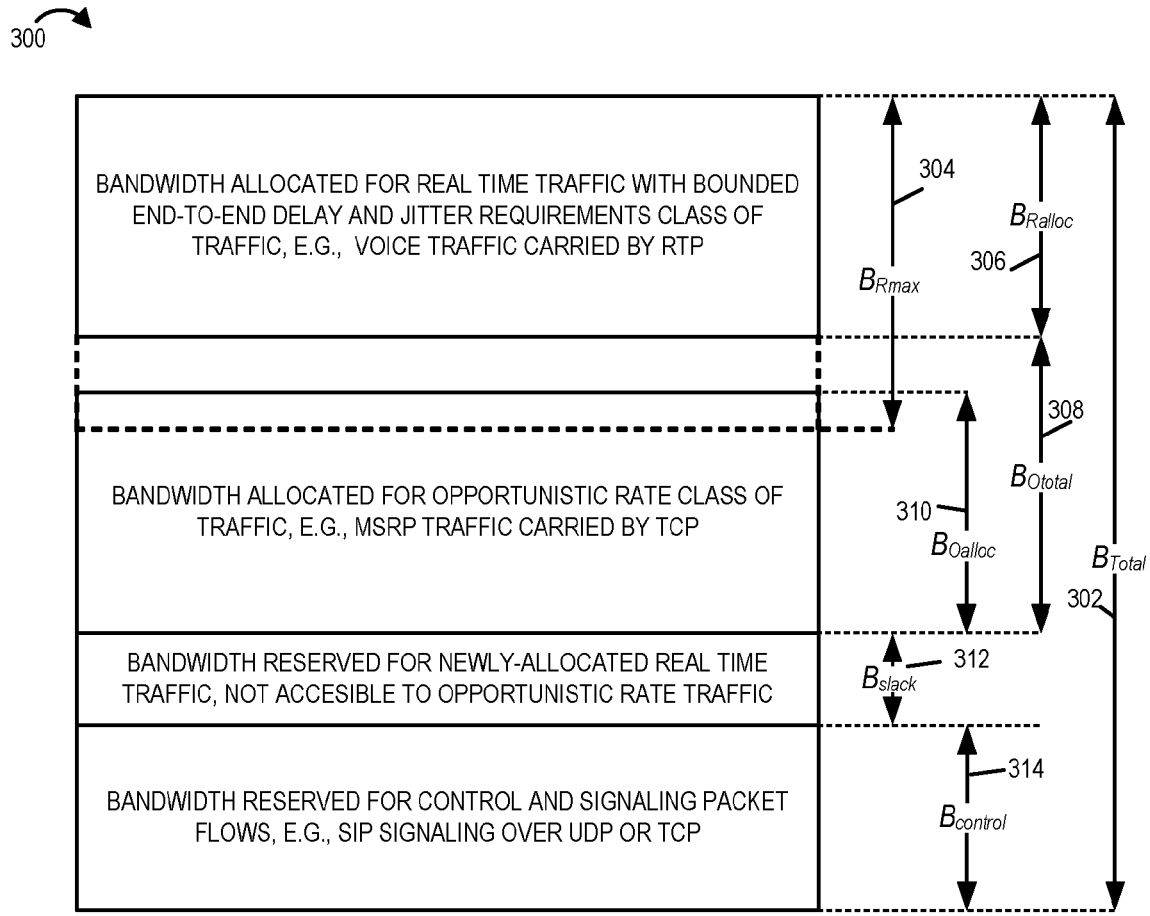
FIG. 3 illustrates an exemplary link bandwidth allocation in accordance with one embodiment of the present invention.

Bandwidth diagram 300 of FIG. 3 illustrates an exemplary bandwidth allocation scheme in accordance with some embodiments of the present invention. The illustration and allocation of bandwidth is meant to be conceptual and is not drawn to scale. Various notations and abbreviations used in various figures and the discussion below are now described.

$B_{total}$ is the total link bandwidth. $B_{total}$ 302 of FIG. 3 provides an illustration of the total link bandwidth in accordance with one embodiment of the present invention.

$B_{control}$ is the reserved bandwidth for control and signaling packet flows. $B_{control}$, the amount of bandwidth reserved for control and signaling packet flows may be, and in some embodiments of the present invention is, configurable by the user and/or may be, and in some embodiments is, assigned automatically by the system, e.g., by the bandwidth allocation manager of the session border controller. $B_{control}$ 314 of FIG. 3 illustrates the bandwidth reserved for control and signaling packet flows, e.g., SIP signaling over UDP (User Datagram Protocol) or TCP (Transmission Control Protocol) in accordance with one embodiment of the present invention.

$B_{slack}$ is the reserved bandwidth for newly-allocated real time packet flows. The slack provides available bandwidth space on the link to accommodate new real time packet flows, e.g., RTP packet flows, while bandwidth adjustments take place. The value of $B_{slack}$ may be, and in some embodiments is, policy based and/or statically configured by the user. For example, the value may be, and in some embodiments is, set to a value of bandwidth required to admit some number of real time packet flows. The number of real time packet flows may be, and in some embodiments of the present invention is, statically configured or dynamically computed as a function of the roundtrip delay experienced in the network environment by the bandwidth allocation manager of the session border controller. In some embodiments $B_{slack}$ is assigned a bandwidth amount in accordance with one of the following equations:

$B_{slack}$=MaxCallRate*RTT*MaxCallDataRate[in absolute bits/sec]

or, $B_{slack}$=MaxCallRate*RTT*MaxCallDataRate/$B_{total}$*100[as a percentage of the total link bandwidth], wherein MaxCallRate is the maximum rate or frequency at which new calls are established expressed in calls/sec, RTT is the round trip delay time for a packet to be sent and an acknowledgement to be received expressed in seconds, MaxCallDataRate is the maximum data rate for a call in absolute bits/sec, and $B_{total}$ is the total link bandwidth in absolute bits/sec. In an exemplary embodiment, a system configured to establish 500 calls/sec (MaxCallRate=500 calls/sec), when operated in an environment with a 100 msec round trip time (RTT=100 msec) and approximately 100 kbits/sec for audio data (MaxCallDataRate=100 kbits/sec) would reserve a total of 5 Mbits/sec of bandwidth for newly-allocated real time packet flows. That is $B_{slack}$=(500 calls/sec)(0.1 sec) (100 kbits/sec)=5 Mbits/sec. Because it takes time to allocate and establish connections and re-distribute bandwidth, the use of $B_{slack}$ bandwidth allows for the smooth establishment of new real time sessions, the allocation of bandwidth related thereto, and the re-distribution of bandwidth used for existing opportunistic rate packet flows. $B_{slack}$ 312 of FIG. 3 illustrates the bandwidth reserved for newly-allocated real time traffic, i.e., real time packet flows, not accessible to opportunistic rate traffic, i.e., opportunistic rate packet flows in accordance with one embodiment of the present invention.

$B_{Rmax}$ is the maximum bandwidth that can be allocated for real time packet flows such as RTP. $B_{Rmax}$ 304 of FIG. 3 illustrates the maximum bandwidth that is available to be allocated for real time packet flows in accordance with one embodiment of the present invention.

$RR_i$ is the requested bandwidth for the $i^{th}$ real time packet flow, $RO_i$ is the requested bandwidth for the $i^{th}$ opportunistic rate packet flow. In various embodiments the requested bandwidth is determined by a policy-based configuration. For example, a MSRP connection may be, and in some embodiments is, used to carry instant messages and image and video files. A user can configure bandwidth to be allocated for such packet flows by using Session Description Protocol (SDP) signals. The use of Attribute line "a=file-selector" in Session Description Protocol signals the intent to use the connection for file transfer.

Throughout the discussion, packet flows corresponding to opportunistic rate traffic are referred to as opportunistic rate packet flows while packet flows corresponding to real time traffic are referred to as real time packet flows.

$AR_i$ is the allocated bandwidth for the $i^{th}$ real time packet flow.

$AO_i$ is the allocated bandwidth for the $i^{th}$ opportunistic rate packet flow.

$LO_i$ is the lower bound bandwidth for the $i^{th}$ opportunistic rate packet flow.

Assuming there are $N_r$ real time sessions currently present in the node, $B_{Ralloc}$ is the total allocated bandwidth for real time traffic, then the equation $$B_{Ralloc} = \sum_{i=1}^{N_r} AR_i$$

provides the total allocated bandwidth for real time traffic as it is equal to the sum of all the allocated bandwidth for each of the real time packet flows. $B_{Ralloc}$ 306 illustrates the bandwidth allocated for real time traffic, i.e., real time packet flows, with bounded end-to-end delay and jitter requirements class of traffic, e.g., voice traffic carried by RTP, in accordance with one embodiment of the present invention.

A new bandwidth allocation request by the jth flow for real time traffic is computed as: $AR_j=RR_j$ if and only if $B_{Ralloc}$ $RR_j \leq B_{Rmax}$, else $AR_j=0$. $AR_j=0$ means that the allocation request is denied. Either all of the requested bandwidth is allocated or the request for bandwidth is rejected.

The total bandwidth available for all opportunistic rate data sessions, $B_{Ototal}$, is determined using the following equation $B_{Ototal}=B_{total}-B_{control}-B_{slack}-B_{Ralloc}$. It will be appreciated that in various embodiments of the present invention this value changes as real time traffic comes and goes.

$B_{Ototal}$ 308 of FIG. 3 illustrates the total bandwidth available for all opportunistic rate packet flows in accordance with one embodiment of the present invention.

Assuming there are $N_o$ opportunistic rate data sessions currently present on the node, $B_{Oalloc}$ is the total allocated bandwidth for opportunistic rate packet flows, and may be calculated as the sum of all the allocated bandwidth for opportunistic rate packet flows in accordance with the following equation.

$$B_{Oalloc} = \sum_{i=1}^{N_o} AO_i$$

$B_{Oalloc}$ 310 of FIG. 3 illustrates the bandwidth allocated for opportunistic rate class of traffic, i.e., opportunistic rate packet flows, e.g., MSRP traffic carried by TCP.

A new allocation bandwidth request by the next flow ($N_o+1$) for opportunistic rate traffic is computed as below:

$AO_{No+1} = RO_{No+1}$ if and only if $(B_{Oalloc} + RO_{No+1}) \leq B_{Ototal}$, else $$AO_{No+1} = \frac{RO_{No+1}}{\sum_{i=1}^{N_o+1} RO_i} \times B_{Ototal}$$

It should be appreciated that a new flow may affect allocated bandwidth for all the existing opportunistic rate packet flows. The allocated bandwidth forth flow is changed from:

$$AO_i = \frac{RO_i}{\sum_{i=1}^{N_o} RO_i} \times B_{Ototal} \text{ to } AO_i = \frac{RO_i}{\sum_{i=1}^{N_o+1} RO_i} \times B_{Ototal}$$

One characteristic of this method is that the opportunistic rate packet flows are able to tap into and use the unused link bandwidth reserved for real time packet flows. Because of this feature, the bandwidth available for opportunistic rate packet flows can change constantly as real time streams come and go. It is possible that when a new allocation request for a real time packet flow is satisfied, the allocation process can affect the total bandwidth available for opportunistic rate packet flows, in turn affecting (altering) the bandwidth allocated for each of the existing opportunistic rate packet flows.

Figure 4:
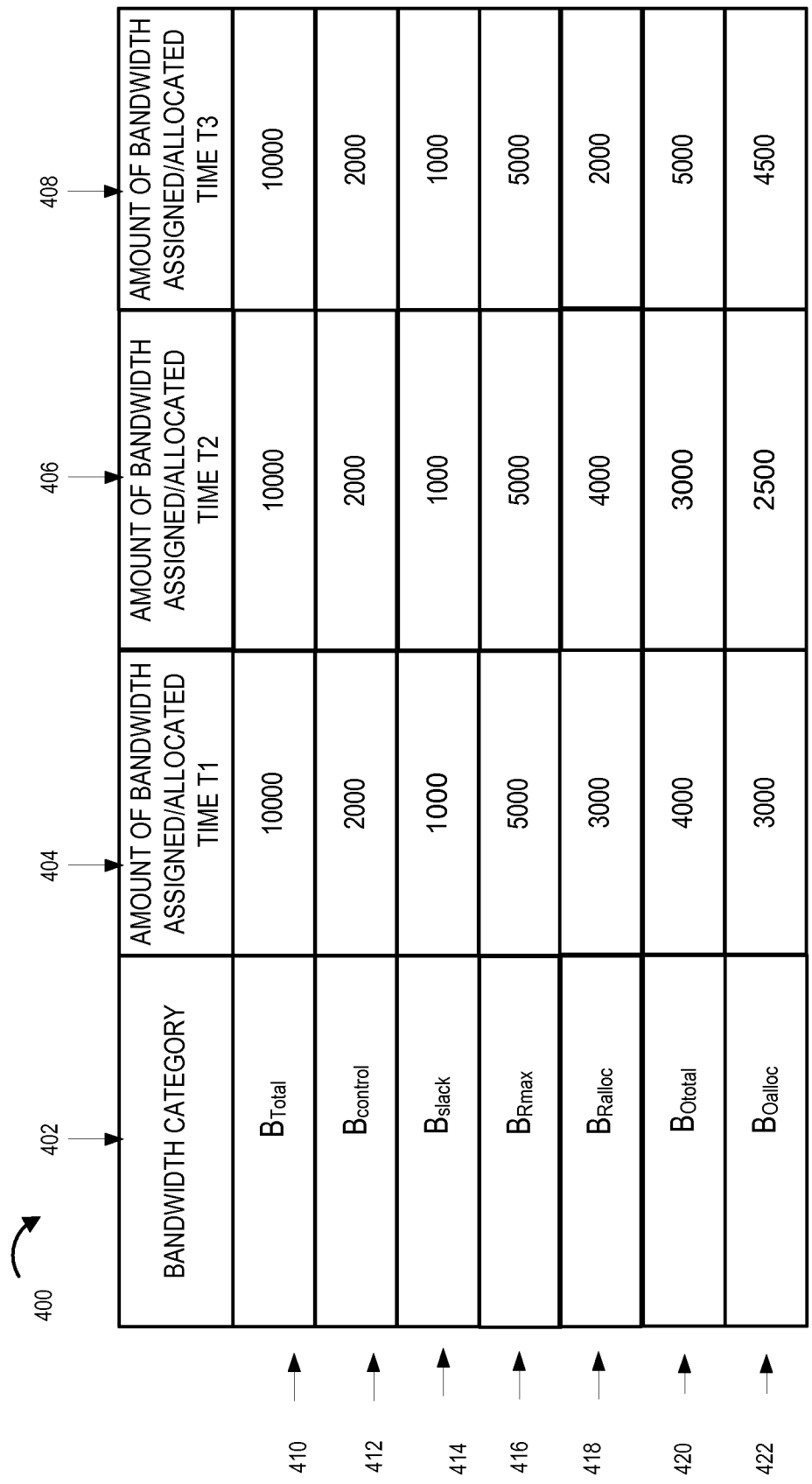
FIG. 4 illustrates an exemplary link bandwidth allocation over a time interval in accordance with one embodiment of the present invention.

Table 400 of FIG. 4 provides an example of a set of bandwidth assignments/allocations for a link in accordance with one embodiment of the present invention. The numerical values provided in table 400 are in units of bandwidth wherein the units can be any units used to measure bandwidth such as absolute bits/sec, bytes/sec, etc. The total bandwidth of the link is 10000 units of bandwidth. The information in each of the rows 410, 412, 414, 416, 418, 420, and 422 of table 400 corresponds to a particular category of bandwidth on a link. The entries in each row of column 402 identify the bandwidth category for which the information contained in that row is applicable. Row 410 provides information regarding the total amount bandwidth available on the link. Row 412 provides information regarding the amount of bandwidth assigned for control and signaling bandwidth on the link. Row 414 provides information regarding the amount of bandwidth assigned as slack bandwidth which is reserved for newly allocated real time packet flows on the link. Row 416 provides information regarding the maximum amount of bandwidth assigned for use by real time packet flows on the link. Row 418 provides information regarding the amount of bandwidth actually allocated to real time packet flows on the link. Row 420 provides information regarding the total amount of bandwidth available for use by opportunistic rate packet flows on the link. Row 422 provides information regarding the amount of bandwidth allocated to opportunistic rate packet flows on the link. The information listed in column 404, 406 and 408 is the amount of bandwidth assigned or allocated at time T1, T2, and T3 on the link respectively for each of the bandwidth categories identified in rows 410, 412, 414, 416, 418, 420, and 422. Note that time T3>T2>T1.

The exemplary methods of the present invention dynamically adjust the bandwidth allocated to the existing flows as new flows get added or the existing flows get removed. In some embodiments, bandwidth re-assigned to a flow could reach below a desired lower bandwidth limit. This lower limit may be, and in some embodiments is, defined and/or set by the system operator and/or automatically set by the system such as the bandwidth allocation manager of the session border controller. For example, an operator may configure the session border controller so that the minimum bandwidth allocated to an MSRP file transfer flow may not be below 200 Kbits/sec.

The bandwidth allocation scheme can be, and in some embodiments of the present invention is, modified to ensure that a lower bound bandwidth criteria is satisfied when admitting new bandwidth allocation requests.

In some, but not all embodiments, the operator assigns based on the local policy the lower bound values for opportunistic rate packet flows. The allocation scheme admits new opportunistic rate packet flows only if lower bound criteria for all the existing opportunistic rate packet flows are satisfied. In cases where opportunistic rate packet flows have already tapped into the unused bandwidth reserved for real time packet flows, a new real time packet flow when admitted could potentially cause lower bound criteria not to be met. In this situation, the allocation scheme stops admitting new opportunistic rate packet flows until bandwidth assigned to each of the existing opportunistic rate packet flows becomes greater than its configured lower bound limit. This scheme and the bandwidth allocation process may be, and in some embodiments of the present invention are, implemented by the bandwidth allocation manager of the session border controller. In some instances instead of the operator assigning the lower bound values the bandwidth allocation manager assigns the values based on policies programmed into its memory or received by the session border controller.

In another embodiment, that also may be implemented within the session border controller, the bandwidth allocation scheme limits the total number of opportunistic rate packet flows based on the total minimum available bandwidth. The minimum available bandwidth for opportunistic rate traffic is equal to $B_{total} - B_{control} - B_{slack} - B_{Rmax}$, when $B_{Rmax}$ is fully used by real time packet flows. When admitting a new opportunistic rate packet flow enumerated as the $N_{0+1}$th flow, the allocation scheme checks $$\text{if} \sum_{i=1}^{N_o} LO_i + LO_{N0+1} <= B_{total} - B_{control} - B_{slack} - B_{Rmax} \text{ then,}$$

the new flow is admitted; otherwise, the bandwidth allocation request for the new flow is rejected. The bandwidth allocated to $N_{0+1}$ flow is modified as follows.

$$B_{Omin} = B_{total} - B_{control} - B_{slack} - B_{Rmax}$$

is the minimum available bandwidth for opportunistic rate traffic. The bandwidth allocated to the $N_{0+1}$th flow is:

$AO_{No+1} = RO_{No+1}$ if and only if $(B_{Oalloc} + RO_{No+1}) \leq B_{Ototal}$, else $$AO_{No+1} = \frac{RO_{No+1}}{\sum_{i=1}^{N_o+1} RO_i} \times (B_{Ototal} - B_{Omin}) + LO_{N0+1}$$

A new opportunistic flow may affect the allocated bandwidth for all the existing opportunistic flows. The allocated bandwidth for $i^{th}$ flow is changed from:

$$AO_i = \frac{RO_i}{\sum_{i=1}^{N_o} RO_i} \times (B_{Ototal} - B_{Omin}) + LO_i \text{ to}$$

$$AO_i = \frac{RO_i}{\sum_{i=1}^{N_o+1} RO_i} \times (B_{Ototal} - B_{Omin}) + LO_i$$

Figure 5A:
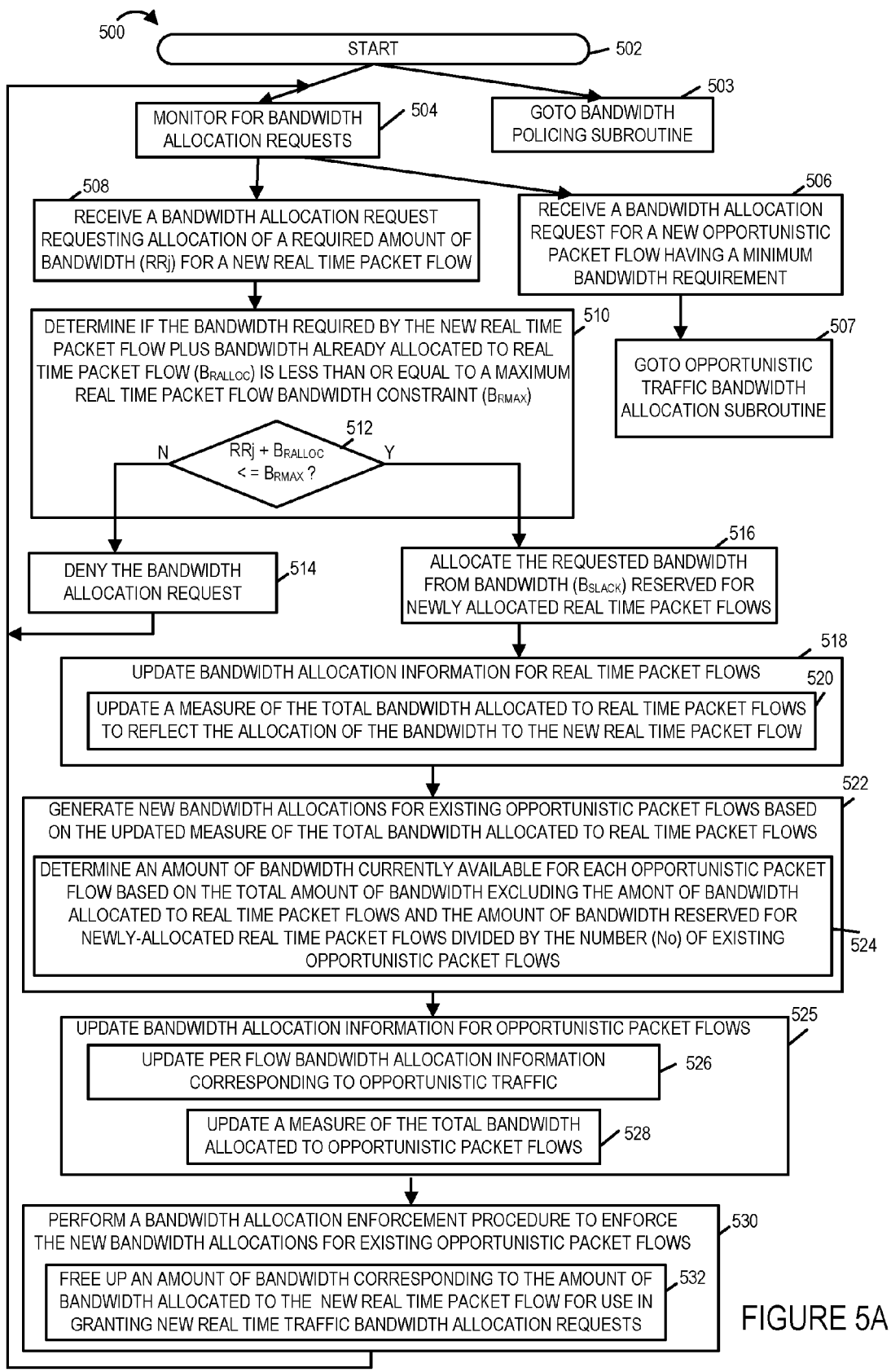
FIG. 5, which comprises the combination of FIGS. 5A, 5B, and 5C, is a flowchart of an exemplary method of sharing bandwidth over a link in a system that supports multiple types of traffic in accordance with one embodiment of the present invention.
Figure 5B:
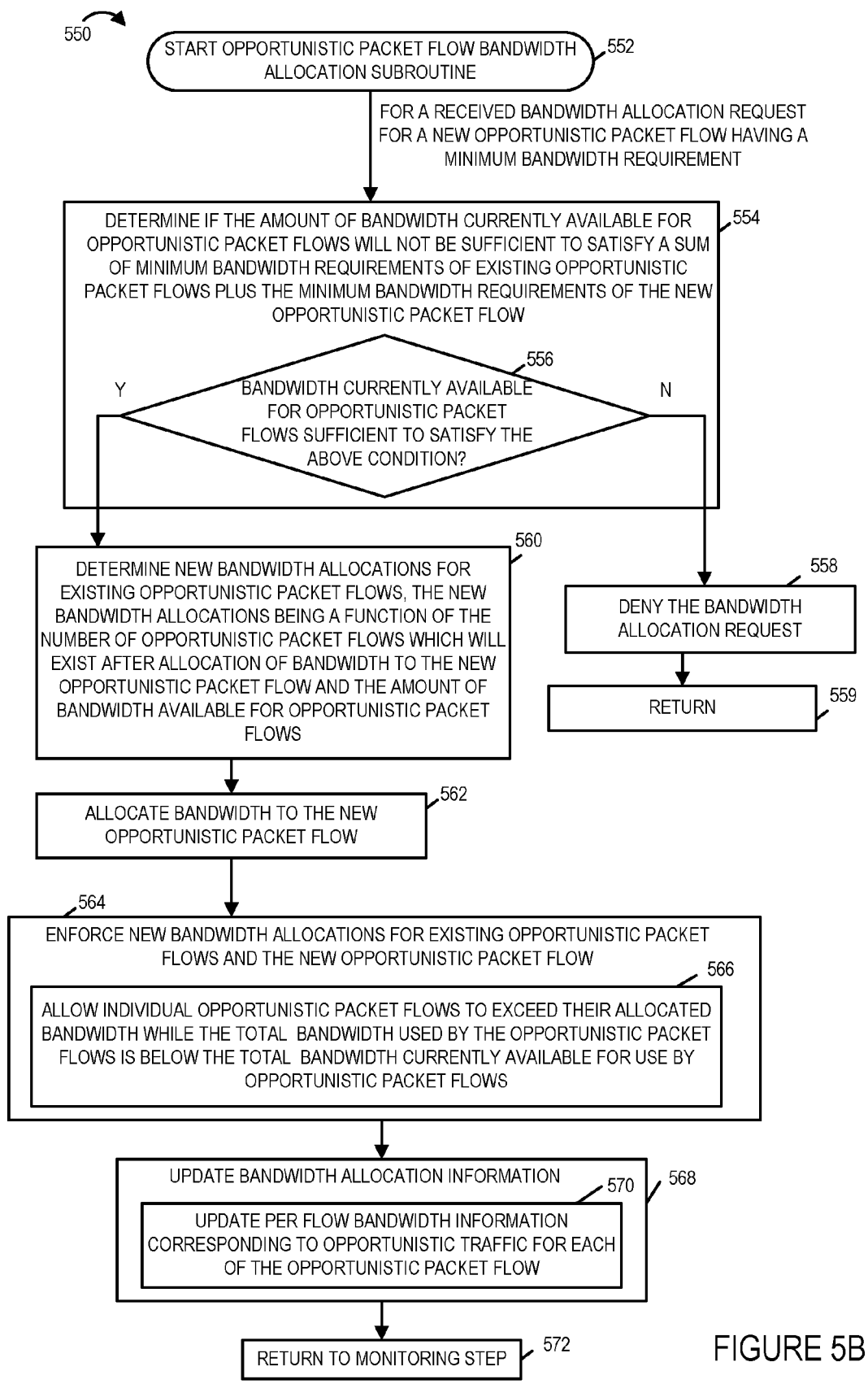

FIG. 5, which comprises the combination of FIG. 5A, FIG. 5B and FIG. 5C, depicts a flowchart 500 of an exemplary method of sharing bandwidth over a link in a system that support multiple types of traffic in accordance with an embodiment of the present invention.

The method of flowchart 500 includes steps performed by elements of an exemplary session border controller SBC1 108 shown in the exemplary system 100 of FIG. 1.

The method 500 starts in step 502, e.g., with the session border controller being initialized. The operation proceeds from step 502 to steps 503 and 504 which are performed by processor 132 asynchronously in some embodiments. In step 503 the SBC processor 132 executes a bandwidth policing subroutine 580 illustrated in FIG. 5C which is discussed in further detail below.

Once initialized, the session border controller at step 504 monitors for bandwidth allocation requests. Upon detection of a bandwidth allocation request for a new opportunistic rate packet flow by the SBC at step 504 operation proceeds from step 504 to receiving step 506. Upon detection of a bandwidth allocation request for a new real time rate packet flow by the SBC at step 504 operation proceeds from step 504 to receiving step 508.

In receiving step 508 the SBC receives a bandwidth allocation request requesting allocation of a required amount of bandwidth ($RR_j$) for a new real time packet flow (RTP flow j). Operation proceeds from step 508 to step 510. In step 510 the SBC determines if the bandwidth required ($RR_j$) by said new real time packet flow plus bandwidth already allocated to real time packet flows ($B_{Ralloc}$) is less than or equal to a maximum real time packet flow bandwidth constraint ($B_{RMAX}$). In some embodiments information regarding bandwidth allocations, e.g., bandwidth already allocated to real time packet flows, bandwidth being used by various opportunistic rate packet flows, total bandwidth being used in the system, etc. is stored in memory, e.g., in a bandwidth allocation table, which is updated regularly to reflect any changes in the bandwidth allocated to various packet flows, e.g., real time and opportunistic rate traffic.

Step 510 includes decision step 512 wherein if it is determined that the bandwidth required ($RR_j$) by the new real time packet flow plus bandwidth already allocated to real time packet flows ($B_{Ralloc}$) is less than or equal to a maximum real time packet flow bandwidth constraint ($B_{RMAX}$) the operation proceeds from step 510 to step 516; otherwise, the operation proceeds to step 514. In step 514, which is performed when it is determined that the bandwidth required ($RR_j$) by the new real time packet flow plus bandwidth already allocated to real time packet flows ($B_{Ralloc}$) exceeds a maximum real time packet flow bandwidth constraint ($B_{RMAX}$), the SBC denies the bandwidth allocation request. Operation proceeds from step 514 back to bandwidth allocation request monitoring step 504.

At step 516, the SBC allocates the requested bandwidth (ARj) to the new real time packet flow (RTP flow j) from bandwidth ($B_{slack}$) reserved for newly-allocated real time packet flows in response to the determination in step 512 that the bandwidth required (RRj) by the new real time packet flow plus the bandwidth already allocated to real time pack flows ($B_{Ralloc}$) is less than or equal to said maximum real time packet flow bandwidth constraint ($B_{RMAX}$). Operation then proceeds from step 516 to step 518. In step 518 the SBC updates bandwidth allocation information for real time packet flows. In various embodiments updating bandwidth allocation information includes updating a table stored in memory containing the bandwidth allocation information. As part of the updating the bandwidth allocation information operation of step 518, step 520 may be, and in some embodiments is, performed. In step 520 a measure of the total amount of bandwidth allocated to real time packet flows is updated to reflect the allocation of bandwidth to the new real time packet flow. In some embodiments, when the system is initialized the total amount of bandwidth allocated to real time packet flows is set to zero and as each new real time packet flow is allocated the amount of new bandwidth allocated is added to the total amount of bandwidth allocated for use by real time packet flows ($B_{Ralloc}$). As a session is terminated and its corresponding real time packet flow or flows cease, the bandwidth is de-allocated. The amount of de-allocated bandwidth is then subtracted from the total amount of bandwidth allocated to real time packet flows ($B_{Ralloc}$). In this way, the SBC tracks the total amount of bandwidth allocated to real time packet flows so it can determine what bandwidth is available for new bandwidth allocation requests.

Operation proceeds from step 518 to step 522. In step 522 the SBC generates new bandwidth allocations for existing opportunistic rate packet flows based on the updated measure of the total amount of bandwidth allocated to real time packet flows, e.g., as discussed with regard to step 518. In some embodiments step 524 is performed as part of step 522. In step 524 the SBC determines the amount of bandwidth currently available for each opportunistic rate packet flow based on the (total amount of bandwidth available for allocation to support real time and opportunistic rate packet flows excluding the amount of bandwidth allocated to real time packet flows ($B_{Ralloc}$) and the amount of the bandwidth reserved for newly-allocated real time packet flows ($B_{slack}$)) divided by the number ($N_O$) of existing opportunistic rate packet flows.

Operation proceeds from step 522 to step 525. In step 525 the SBC updates bandwidth allocation information for opportunistic rate packet flows. In various embodiments updating bandwidth allocation information includes updating a table in memory in which the bandwidth allocation information is stored. In some embodiments, processing steps 526 and 528 are performed as part of updating the bandwidth allocation information step 525. In step 526 per flow bandwidth allocation information indicating the bandwidth allocated for each of a plurality of opportunistic rate packet flows, is updated. In accordance with one aspect of the present invention, when there is change in the amount of total bandwidth allocated to real time packet flows, e.g., due to allocation of bandwidth to a new real time packet flow, the allocated bandwidth corresponding to individual existing opportunistic rate packet flow changes. This is so because opportunistic rate packet flows and real time packet flows make use of shared bandwidth. Thus when a new real time packet flow is allocated bandwidth, there is a redistribution of allocated bandwidth for each of the existing opportunistic rate traffic flows which cause changes in bandwidth allocated for one or more existing opportunistic rate packet flows. Similarly when there is a de-allocation of bandwidth being used for real time packet flows, the additional bandwidth becomes available for the existing opportunistic rate packet flows and is accordingly redistributed to the existing opportunistic rate packet flows. In step 528 the SBC updates a measure of the total bandwidth allocated to opportunistic rate packet flows. From step 525 operation proceeds to step 530.

In step 530 the SBC performs a bandwidth allocation enforcement operation to enforce the new bandwidth allocations for existing opportunistic rate packet flows. In various embodiments performing a bandwidth allocation enforcement procedure frees up an amount of bandwidth corresponding to the amount of bandwidth allocated to the new real time packet flow for use in granting new real time traffic bandwidth allocation requests, as illustrated in step 532 which is performed as part of step 530 in some embodiments. This is done by de-allocating an amount of bandwidth allocated for opportunistic rate packet flows equal to the amount of bandwidth allocated to the new real time packet flow and generating new bandwidth allocations for existing opportunistic rate packet flows. In some embodiments the new bandwidth allocation for existing opportunistic rate packet flows is generated by determining an amount of bandwidth currently available for each existing opportunistic rate packet flow based on the total amount of the link's bandwidth available for allocation to support opportunistic rate packet flows $B_{Ototal}$ divided by the number (No) of existing opportunistic rate packet flows. In this way each opportunistic rate packet flow is provided an equal amount of bandwidth. The total amount of the link's bandwidth available for allocation to support opportunistic rate packet flows ($B_{Ototal}$), may be and in some embodiments is, determined by calculating the total amount of bandwidth on the link ($B_{total}$) and subtracting from this total the amount of bandwidth reserved for control traffic newly ($B_{control}$), the amount of bandwidth reserved for newly-allocated real time packet flows ($B_{slack}$), and the amount of bandwidth allocated for real time packet flows ($B_{Ralloc}$) In equation form, this may be represented as $B_{Ototal}=B_{total}-B_{control}-B_{slack}-B_{Ralloc}$. In some embodiments, as the amount of bandwidth reserved for control and signaling traffic is fixed, the total bandwidth available for allocation to support real time and opportunistic rate packet flows is referred to as $B_{Tot}$. The total amount of opportunistic bandwidth available for allocation $B_{Ototal}$ in some of these embodiments is determined by subtracting the total amount of bandwidth reserved for newly-allocated real time packet flows ($B_{slack}$) and the amount of allocated bandwidth allocated for real time packet flows ($B_{Ralloc}$) from the total amount of bandwidth available for allocation to support real time and opportunistic rate packet flows ($B_{Tot}$). Once the total amount of bandwidth available for opportunistic rate packet flows ($B_{Ototal}$) is determined, the bandwidth for each existing opportunistic rate packet flow is determined by dividing the total amount of opportunistic bandwidth available for allocation ($B_{Ototal}$) by the number of currently existing opportunistic rate packet flows (No). Each opportunistic rate packet flow is then allocated an equal amount of the available opportunistic bandwidth.

In this way the bandwidth freed by enforcing the new bandwidth allocation for existing opportunistic rate packet flows restores the amount of reserved bandwidth available for newly-allocated real time packet flows to the amount available ($B_{slack}$) prior to allocating bandwidth to said new real time packet flow. Operation proceeds from step 530 back to monitoring step 504.

Referring once again to step 504, during monitoring operation in step 504 if the SBC detects a bandwidth allocation request for an opportunistic rate packet flow, the operation proceeds from step 504 to step 506. In step 506 the SBC receives a bandwidth allocation request for a new opportunistic rate packet flow having a minimum bandwidth requirement. Operation proceeds from step 506 to step 507 where the SBC executes the opportunistic rate packet flow bandwidth allocation subroutine 550. Operation steps associated with an exemplary opportunistic rate packet flow bandwidth allocation subroutine 550 are illustrated in FIG. 5B. The opportunistic rate packet bandwidth allocation subroutine starts in step 552. Operation proceeds from start step 552 to step 554.

In step 554 a determination is made as to whether the amount of bandwidth currently available for opportunistic rate packet flows will be sufficient to satisfy a sum of minimum bandwidth requirements of existing opportunistic rate packet flows plus the minimum bandwidth requirement of the new opportunistic rate packet flow or not. In various embodiments, the SBC checks the bandwidth allocation table stored in memory to determine whether or not the above condition is satisfied. Step 554 includes decision step 556 which determines that if the bandwidth currently available for opportunistic rate packet flows is sufficient to satisfy the above condition, i.e., if the amount of bandwidth currently available for opportunistic rate packet flows is sufficient to satisfy a sum of minimum bandwidth requirements of existing opportunistic rate packet flows plus the minimum bandwidth requirement of the new opportunistic rate packet flow, the operation proceeds from step 554 to step 560; otherwise, the operation proceeds to step 558.

In step 558, which is performed when it is determined that the amount of bandwidth currently available for opportunistic rate packet flows will not be sufficient to satisfy a sum of minimum bandwidth requirements of existing opportunistic rate packet flows plus the minimum bandwidth requirement of the new opportunistic rate packet flow, the SBC denies the bandwidth allocation request. On the other hand, when the condition is satisfied, step 560 is performed wherein the SBC determines new bandwidth allocations for existing opportunistic rate packet flows, the new bandwidth allocations being a function of the number of opportunistic rate packet flows which will exist after the allocation of bandwidth to the new opportunistic rate packet flow and the amount of bandwidth available for allocation to opportunistic rate packet flows.

Operation proceeds from step 560 to step 562. In step 562 bandwidth is allocated to the new opportunistic rate packet flow. Operation proceeds from step 562 to step 564. In step 564 the SBC enforces new bandwidth allocations for existing opportunistic rate packet flows and the new opportunistic rate packet flow. In some embodiments step 566 is performed as part of step 564. In step 566 one or more individual opportunistic rate packet flows are allowed to exceed their allocated bandwidth while the total bandwidth used by said opportunistic rate packet flows is below the total bandwidth currently available for use by opportunistic rate packet flows.

Operation proceeds from step 564 to step 568. In step 568 the bandwidth allocation information corresponding to various packet flows is updated. In various embodiments, as part of update step 568, step 570 is performed wherein the per flow bandwidth information corresponding to opportunistic rate traffic for each of the opportunistic rate traffic flows is updated for example a table stored in memory containing the per flow bandwidth information may be, and in some embodiments, is updated. Operation returns to the monitoring step 504 of FIG. 5A via the return step 572.

Referring now to FIG. 5C, which illustrates the steps associated with an exemplary bandwidth policing subroutine 580, in some embodiments the SBC uses the bandwidth policing subroutine 580 to control one or more opportunistic rate packet flows which are using more than their allocated bandwidth. The bandwidth policing subroutine 580 starts in step 582. Operation proceeds from step 582 to step 584. In step 584 the opportunistic rate packet flows are monitored to identify one or more individual opportunistic rate packet flows that use more than their allocated bandwidth. The monitoring step 584 is performed on an ongoing basis in some embodiments.

Operation proceeds from step 584 to step 586. In step 586 when the total bandwidth which the opportunistic rate packet flows attempt to use exceeds the total bandwidth currently available for use by opportunistic rate packet flows, the SBC performs a rate control operation on at least one identified individual opportunistic rate packet flow that uses more than its allocated bandwidth. Thus it should be appreciated that the bandwidth policing operation ensures that excessive use of bandwidth by opportunistic rate packet flows is controlled appropriately. In various embodiments, at least one of steps 588 or 590 is performed as part of step 586. In step 588 the SBC performs a packet dropping operation. In some embodiments the rate control operation includes dropping packets at a rate sufficient to trigger a congestion avoidance operation in a sender of the dropped packets. In some embodiments the rate control operation includes dropping packets, said packet dropping triggering a higher level rate control operation in the sender of the dropped packets. In step 590 a flow control signal is sent to a sender of packets corresponding to the at least one identified individual opportunistic rate packet flow as part of the rate control operation. In some embodiments the flow control signal is a receive window adjustment signal. In some embodiments the receive window adjustment signal is a TCP receive window adjustment signal.

In some embodiments of the present invention, bandwidth control methods are implemented to enforce bandwidth usage policies and assigned allocations. While the following techniques for enforcing bandwidth usage policies and assigned allocations are described in the context of an example using MSRP opportunistic rate traffic carried over TCP transport, the techniques described can be applied to other embodiments of the present invention. For this example, Endpoint-1 102 of FIG. 1 is a MSRP source device that attempts to transmit data at a higher rate than its allocated bit-rate. This means a TCP connection carrying opportunistic rate traffic from Endpoint-1 102 would utilize more bandwidth than its allocated limit. To guarantee that the Quality of Service (QoS) of the real time packet flows is not affected by the opportunistic rate MSRP traffic flowing through a network node, the total bandwidth utilized by all opportunistic rate MSRP packet flows flowing through the node at any given time is restricted to be less than or equal to the total bandwidth minus the bandwidth reserved for control and signaling, new real time traffic slack, and the bandwidth allocated for real time traffic ($B_{Oalloc} <= B_{total} - B_{control} - B_{slack} - B_{Ralloc}$). In some embodiments of the present invention, in order to ensure that a flow does not exceed its allocated bandwidth limit, a method is employed which triggers TCP congestion avoidance processes at the source, e.g., Endpoint 1 102, which will reduce the data transmission rate at the source. In some embodiments, the TCP congestion avoidance method is only triggered when there is a contention for bandwidth, i.e. total required bandwidth exceeds the total allocated bandwidth for opportunistic rate traffic. In some embodiments of the present invention, in order to ensure that the bandwidth is fairly distributed among all the active flows, various features of the present invention further trigger TCP congestion avoidance for those devices or the sources that transmit data at rates higher than their assigned rates.

The TCP protocol has built in support for congestion control. The congestion control mechanism ensures that a TCP endpoint does not pump data at a rate higher than what the network can handle. In accordance with one embodiment of the present invention the data arrival rate on a TCP connection is monitored and one or more TCP packets are dropped when the arrival data rate exceeds the allocated rate, and there is a contention for bandwidth resources. In this example, when there is contention for bandwidth at a node, e.g., SBC-1 108, and it is determined that the rate of data packets arriving from Endpoint 1 102 over link 118 exceeds its assigned bandwidth limit, then SBC-1 108 begins dropping packets arriving from Endpoint 1 102 this results in the TCP layer initiating congestion control and adjusting the Endpoint 1 102 data transmission rate. Priority based token bucket policers which will be discussed in further detail below may be, and in some embodiments of the present invention, are used to enforce bandwidth assignments.

Figure 6:
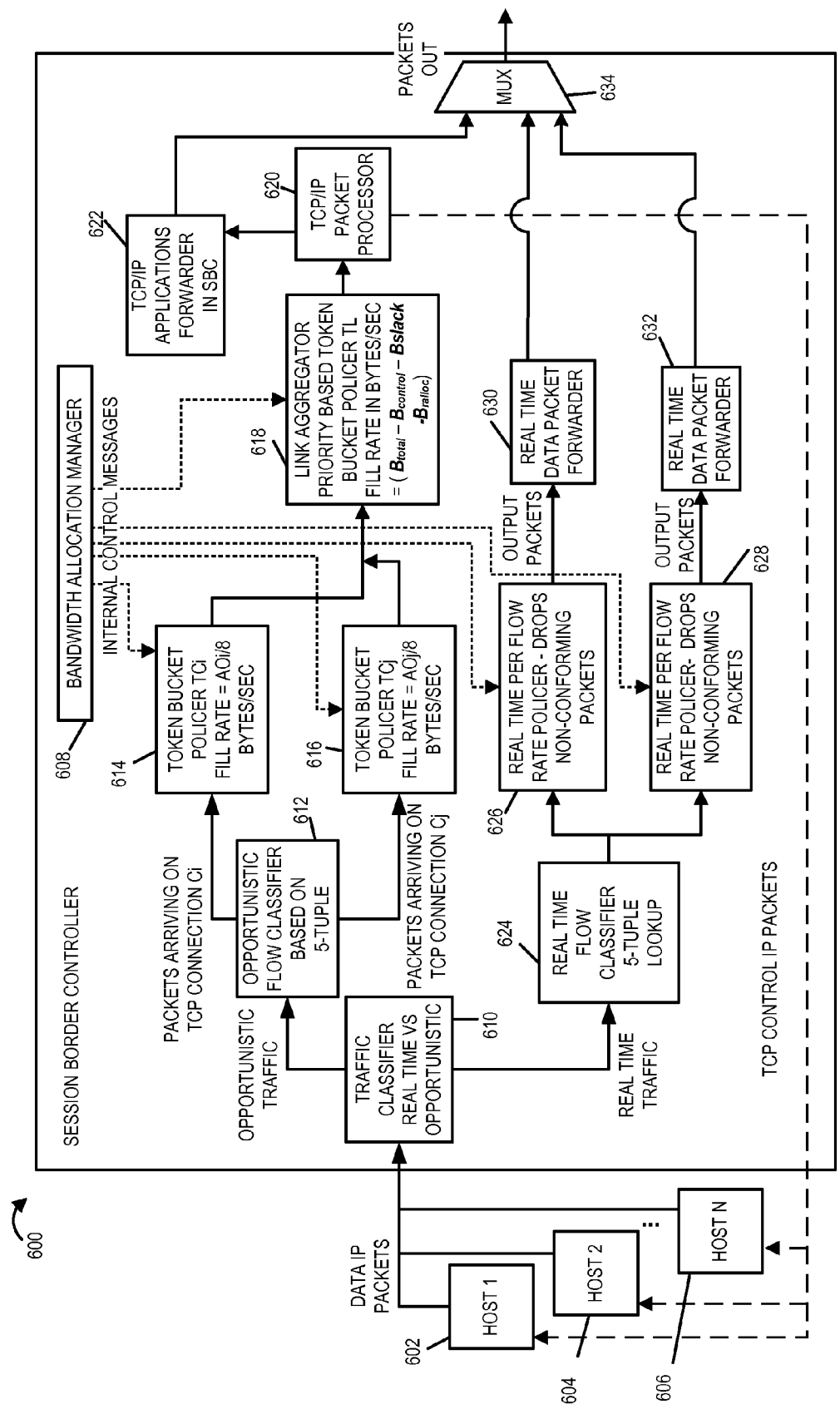
FIG. 6 illustrates an exemplary bandwidth control process for real time and opportunistic rate packet flows in accordance with one embodiment of the present invention.

For opportunistic rate traffic carried over TCP such as the MSRP example discussed above, the TCP layer initiates congestion control and adjusts the rate at which data is sent to the network whenever it detects packet loss such as when the SBC-1 108 begins dropping packets. This attribute of the TCP protocol is used to control bandwidth utilized by a TCP connection. FIG. 6 provides an exemplary packet flow policing architecture with multiple stages of token bucket policers that may be, and in some embodiments of the present invention is, used to control the traffic rate on a per connection basis as well as on a per link basis. Any packets dropped by this policing architecture will result in the activation of TCP congestion control procedures.

Diagram 600 of FIG. 6 illustrates an exemplary bandwidth control mechanism for real time and opportunistic rate traffic implemented in a session border controller, e.g., SBC-1 108 of FIG. 1, in accordance with one embodiment of the present invention. In this example, the SBC-1 108 assembly of modules 144 includes the following modules: bandwidth allocation manager module 608, traffic classifier real time versus opportunistic module 610, opportunistic flow classifier 612, token bucket policer TCi module 614, token bucket policer TC2 module 616, link aggregate priority based token bucket policer TL module 618, TCP/IP packet processor module 620, TCP/IP applications forwarder module 622, real time flow classifier module 624, real time per flow rate policer module 626, real time per flow rate policer module 628, real time data packet forwarder module 630, real time data packet forwarder module 632, and multiplexer 634. In some embodiments, one or more of these modules or part of one or more of these modules may be implemented as software modules in which case the software modules would be included in the assembly of software modules 140 of memory 138 of SBC 1 108 and implemented on processor 132. Processor 132 may be, and in some embodiments is implemented as a plurality of processors.

In the bandwidth control mechanism 600 of FIG. 6, host 1 602, host 2, 604, . . . , host N 606 transmit data IP packets to SBC-1 108. The data IP packets form real time and/or opportunistic rate packet flows. The bandwidth allocation manager allocates bandwidth to each of the data flows and sends internal control messages to the policers 614, 616, 618, 626, 628 over internal communication bus 146. The token bucket policers 614 and 616 are per connection policers.

A receiver in the I/O Interface 134 of Session Border Control 1 108 receives the incoming data packet flows. Processor 132 directs each received data packets to real time versus opportunistic rate traffic classifier module 610 where each received data packet is classified. Each packet classified as an opportunistic data packet is passed to the opportunistic flow classifier module 612 while each data packet classified as a real time data packet is sent to the real time flow classifier 624. The opportunistic flow classifier and real time flow classifier use a 5-tuple-flow lookup based on the data packets source IP address, source port, destination IP address, destination port, and incoming VLAN to determine which flow the data packet belongs to and whether the flow has already been established or needs to be established. Based on the 5-Tuple look up, the opportunistic flow classifier module 612 classifies the flows by TCP connection and sends packets classified as part of a flow arriving on TCP connection Ci to token bucket policer TCi module 614. Packets classified as arriving on TCP connection Cj are sent to token bucket policer TC2 616. The policer modules 614 and 616 are per connection/flow policers. While they have been implemented as token bucket policers other types of policers may be, and in some embodiments of the present invention are, used. The token bucket policer modules 614 and 616 do not discard any packets. Instead, the token bucket policer marks each packet as either conforming or non-conforming, and sends it to the next stage policer for aggregate policing. Token bucket policer modules 614 and 616 inspect the data packets they receive and mark the data packets as conforming if and only if there are more tokens in the their respect buckets than the number of bytes in the TCP payload; otherwise, the data packet is marked as non-conforming. Each token bucket policer module 614 and 616 will have a token bucket having a specified fill rate based on the assigned bandwidth for the particular flow which is being policed. The token bucket fill rate is determined by the bandwidth allocation manager module 608 and transmitted to the token bucket policer modules 614 and 616 via internal control messages sent over internal communication bus 146.

After the packet has been marked as conforming or non-conforming, a priority value is assigned to the packet for use in the second stage of policing, by the link aggregate policer module 618 which has been implemented in this example as a priority based token bucket policer. The priority assigned to a conforming packet is higher than the priority assigned to a non-conforming packet. Each priority value corresponds to a priority level in the priority based token bucket policer for link aggregate policing.

Figure 7:
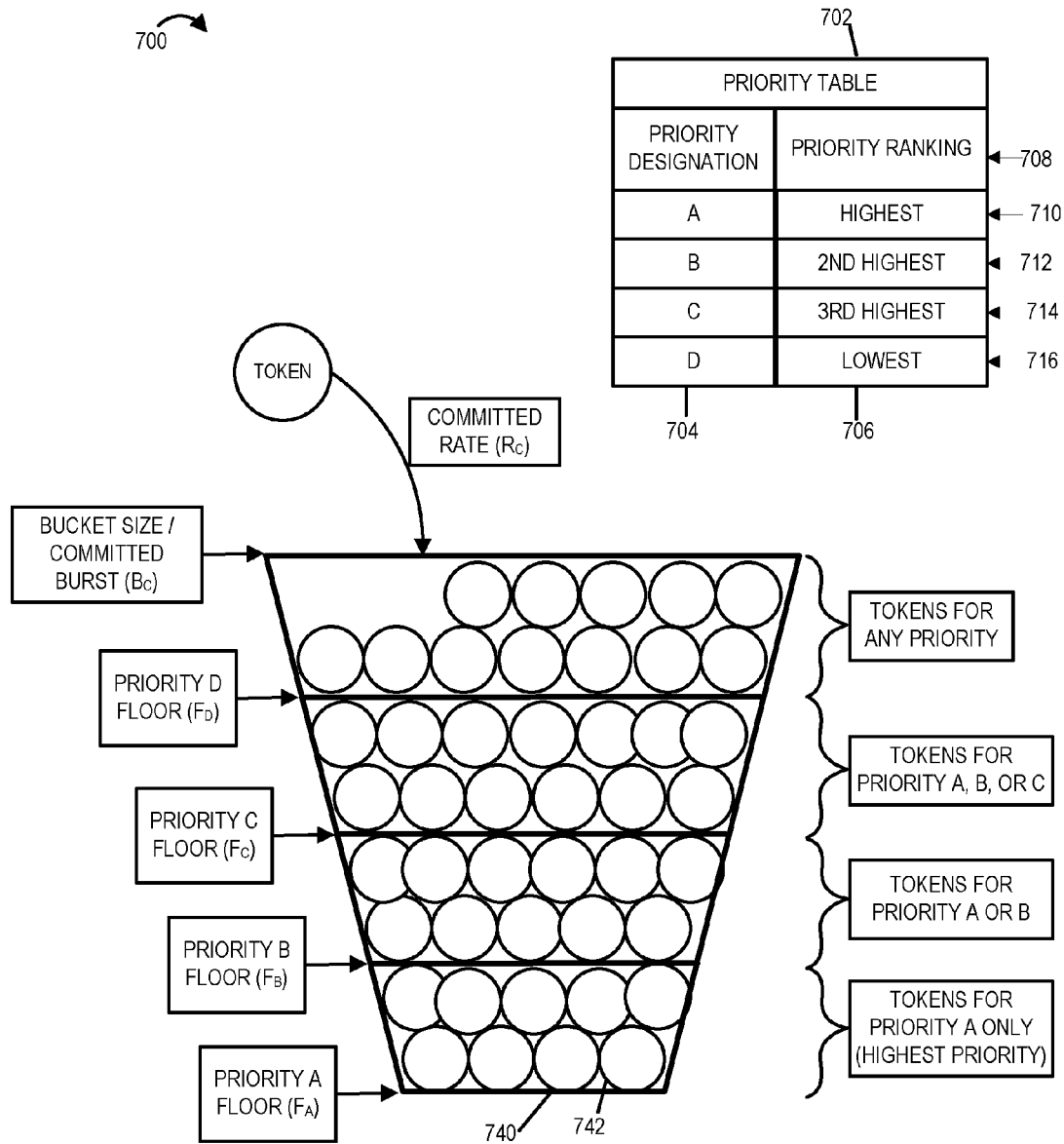
FIG. 7 illustrates an exemplary priority token bucket policer.

Diagram 700 of FIG. 7 illustrates an exemplary priority token bucket policer that may be, and in some embodiments of the present invention is, used as the link aggregator policer module 618.

The priority bucket policer of diagram 700 includes a priority table 702 which is stored in memory, e.g. memory 138, that shows the priority designation and associated priority ranking to be used in policing packets. Row 708 contains table information listing the information in column 704 and column 708 as containing priority designations and priority rankings respectively. The information in row 710 of priority table 702 indicates that priority designation A has the highest ranking. The information in row 712 of priority table 702 indicates that priority designation B has the second highest ranking. The information in row 714 of priority table 702 indicates that priority designation C has the third highest ranking. The information in row 716 indicates that priority designation D has the lowest priority ranking. Policing bucket 740 contains a plurality of tokens 742. Packets with the highest priority (A) have access to any credits in the bucket. Packets with the lowest priority (D) only have access to credits above the Priority D floor ($F_D$). Packets with intermediate priority levels have access to credits above the corresponding intermediate floors. In some embodiments the policer makes bandwidth policy enforcement decisions based on the number of tokens corresponding to the various priority levels of the packet flows in the token bucket 740 at a particular point in time. As should be appreciated a variety of policing mechanism may be used and the FIG. 7 token bucket approach is only exemplary of one possible technique.

The link aggregate policer module 618 controls the overall rate of packets from all opportunistic rate packet flows (i.e. packet flows delivered from policer module 614 and 616 in the present example), with priority given to conforming data packet from each flow. In some embodiments, one link aggregate policer per physical interface is used. In some embodiments a packet is allowed through the link aggregate policer module 618 (to the TCP/IP packet processor module 620) if and only if there are more tokens above the priority floor than the number of bytes in the TCP payload; otherwise the packet is dropped.

If a packet is allowed to pass through the link aggregate policer module 618 it is sent to TCP/IP packet processor module 620 which reprocesses the packet forwarding to the destination address. From the TCP/IP packet processor module the packet is then sent to the TCP/IP applications forwarder module 622 and prepared to be forwarded. From the TCP/IP applications forwarder module 622 it is sent to the multiplexer 634 where the packet is multiplexed with the real time packets from real time packet forwarder modules 630 and 632 and outputted from the session border controller onto a link such as link 124 via I/O Interfaces 136 for transmission to its destination via the core network.

Returning to the processing of real time data packets, those data packets which were classified at traffic classifier module 610 as real time data packets and sent to real time flow classifier module 624 are inspected and classified by flow/connection based on a 5-tuple classifier. Once classified by flow, the real time data packet is sent to either real time per flow rate policer module 626 or real time per flow rate policer 628. The bandwidth allocation manager module, via internal control messages sent over communication bus 146, identifies the amount of bandwidth allocated to each of the flows/connections being policed by the real time policer modules 626 and 628 respectively. The real time per flow rate policers 626 and 628 determine whether the real time flows they are policing are using bandwidth in excess of the amount allocated by the bandwidth allocation manager module 608 and drops non-conforming packets. The real time per flow rate policer modules 626 and 628 may be, and in some embodiments of the present invention are, token bucket policers. Data packets identified by real time policer module 626 as conforming to the allocated data rate are sent to real time data packet forwarder module 630. Data packets identified by real time policer module 628 as conforming to the allocated data rate are sent to real time data packet forwarder module 632. The real time data packet forwarder modules 630 and 632 process the packets and prepare the packets to be forwarded to their destination. The packets are sent from the real time data packet forwarder modules 630 and 632 to multiplexer 634 which multiplexes the real time and opportunistic data rate packets and outputs the packets from the session border controller onto a link such as link 124 via I/O Interfaces 136 for transmission to their destination via the core network.

Figure 8:
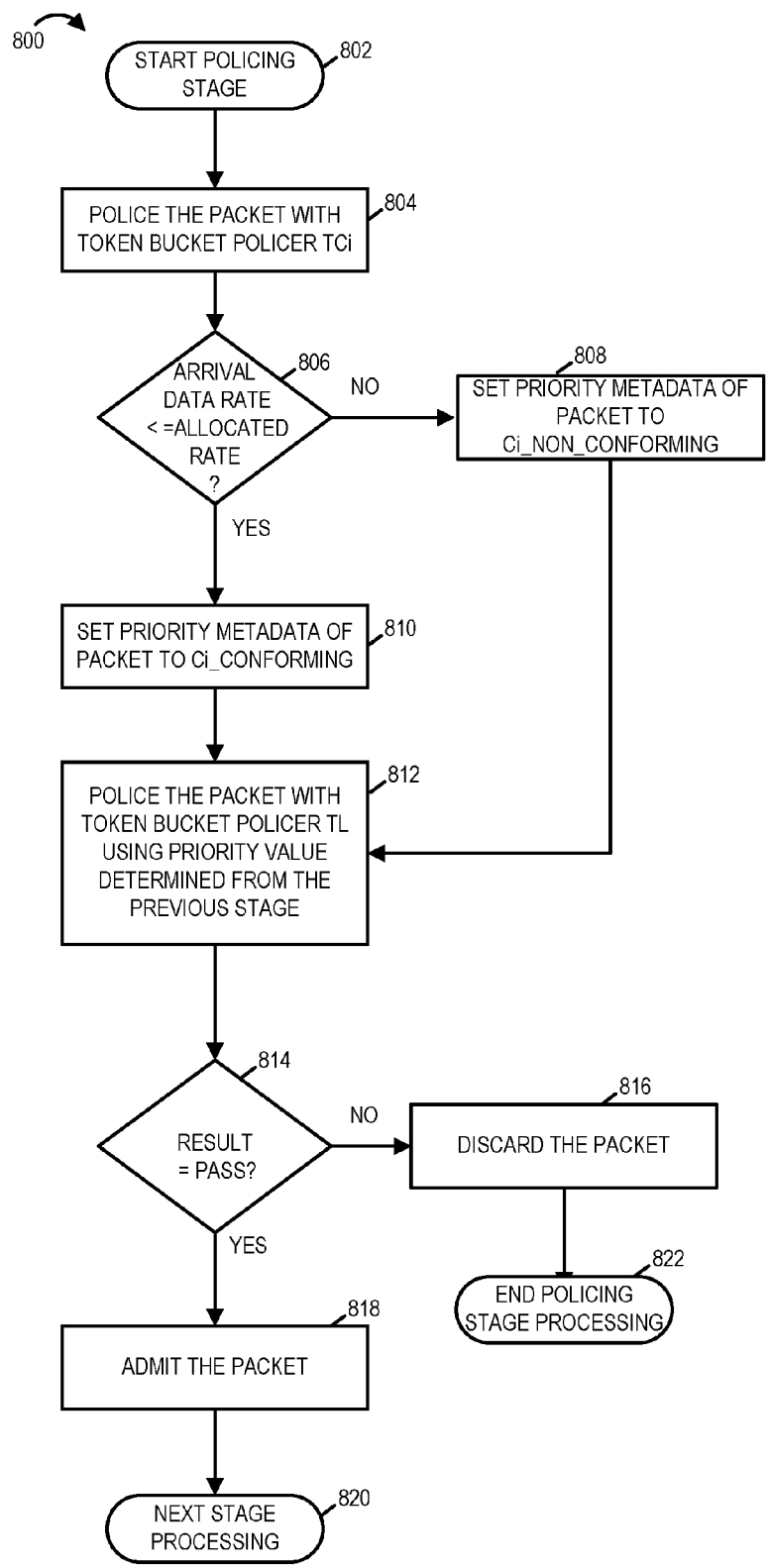
FIG. 8 illustrates an exemplary policing stage for an opportunistic rate packet flow in accordance with one embodiment of the present invention.

In some embodiments of the present invention, packet policers are not used for real time packet flows in which case the packets from the real time packet flows are multiplexed with the opportunistic rate packet flows by multiplexer 634 without policing. In the exemplary embodiment, the fill rate of a per connection opportunistic policer, such as policer modules 614 and 616, is initially set to that connection's allocated bandwidth (AOi). This fill rate may be dynamically altered as needed to adjust relative QoS between a changing number of opportunistic rate traffic flows that need to be shared over changing bandwidth availability for opportunistic rate traffic. If the total allocated bandwidth for these flows ($B_{Oalloc}$) exceeds the fill rate of the link aggregate policer module, the fill rates in all per connection policers are adjusted to maintain an equal QoS across all flows. One such exemplary implementation is described in method 800 of FIG. 8.

In method 800, processing starts at step 802 when the policing module 614 is initialized and the processor associated with policing module 614 receives an opportunistic data packet from opportunistic flow classifier module 612. Processing proceeds from step 802 to step 804. At step 804, the policer module 614 polices the received packet with token bucket policer TCi. From step 804, processing proceeds to decision step 806. The processor associated with policer module 614 determines whether the arrival data rate of the data packet flow being policed is less than or equal to the allocated data packet rate for the opportunistic rate packet flow being policed. If the arrival rate is not less than allocated rate than processing proceeds to step 808. At step 808, the policer module 614 marks the data packet as a non-conforming data packet by setting the priority metadata of the packet to Ci_NON_CONFORMING indicating it is a packet from the flow associated with connection Ci and is a non_conforming packet. From step 808 processing proceeds to step 812.

When the arrival data rate is less than allocated rate processing proceeds from decision step 806 to step 810. In step 810, the policer module 614 marks the data packet as conforming by setting the priority metadata of the packet to Ci_CONFORMING indicating it is a packet from the flow associated with connection Ci and is conforming packet. Processing then proceeds to step 812.

At step 812, aggregate policer 618 polices the packet with token bucket policer TL using priority values determined in steps 808 and 810. From step 812 processing proceeds to decision step 814. At decision step 814, if the packet policing result was that the packet passed the test then processing proceeds to step 818 where the packet is admitted. If the packet did not pass the aggregate policing test of step 814 then processing proceeds from decision step 814 to step 816 where the aggregate policer module 618 discards the packet. Processing proceeds from step 816 to end step 822 as the processing associated with this packet is completed. Processing associated with other packets in the session border controller continues. Processing proceeds from steps 818 to step 820 where the next stage of the processing the packet is undertaken.

In accordance with one aspect of the present invention, the fill rate of the link aggregate policer token bucket 618 is limited to be less than or equal to the total link bandwidth minus the bandwidth reserved for control and signaling traffic minus the slack bandwidth reserved for new real time packet flows minus the total bandwidth allocated for real time packet flows ($<=B_{total}-B_{control}-B_{slack}-B_{Ralloc}$). This fill rate may be dynamically adjusted as needed by the bandwidth allocation manager module 608 to guarantee additional bandwidth for new real time packet flows or to make use of bandwidth made available by terminated real time packet flows.

Aggregate policer module 618, may be, and in some embodiments is, configured to implement policies distributed to it by the bandwidth allocation manager. For example, in some embodiments of the present invention, the aggregate policer module 618 based on local policy drops packets when the overall data arrival rate measured in terms of bytes per sec exceeds the total allocated bandwidth (converted to bytes per sec) for opportunistic rate network traffic. In this situation when the data packet arrival rate exceeds the allocated bandwidth, congestion control is triggered on those connections where data rates exceed their allocated rates meaning connections where there are non-conforming packets. This allows the session border controller SBD 1 108 to provide a fair share of bandwidth to all the communicating entities. If all the connections are conforming to their allocated rates, then congestion control is triggered on those connections that assign low priority values to their conforming packets. This attribute allows relative QoS to be delivered to traffic over different connections.

In some embodiments of the present invention flow control is implemented via mechanisms in the transport protocol. For example, connection oriented transport such as TCP implements mechanisms to control data transmission rate. TCP flow control adjusts the receive window size when advertising the window to the sender in order to force the sender to conform to a desired data transmission rate. The processor and/or module (e.g., processor 132 of SBC 1 108) implementing the TCP protocol computes the receive window size based on available buffer space on the receiver (e.g., receiver I/O interfaces 134 and/or associated data/information memory 142 of memory 138). In accordance with some embodiments of the present invention, the computation of the TCP receive window size is modified so that the window size is based on the volume of non-conforming data bytes received over the TCP connection in a given duration. A method to determine the non-conforming packets was described in connection with FIG. 6. Once the non-conforming packets are identified each policer module, e.g., policer modules 614 and 616, will sum up the number of non-conforming packets received over a specific time period and store the result in the data/information section 142 of memory 138 for later use for example in adjusting the receive window size. In one embodiment of the present invention, the receive window is adjusted as follows. The new receive window is equal to the current receive window, i.e. the receiver's available buffer space, minus the number of non-conforming data bytes received between the last acknowledge sent by the receiver and the current time. If the new receive window is less than zero, then the new receive window size is set to zero. This is expressed in equation form as:

> New Receive Window=Current Receive Window Size (=Available Buffer space)−Number of Non-Conforming data bytes received between last ACK sent by the receiver and now. If New Receive Window is <0, then New Receive Window=0.

Another method of forcing the sender, e.g., host 1 602 of FIG. 6, to conform to the allocated data transmission rate is by dropping non-conforming packets. As previously discussed, this forces the sender to go to a congestion avoidance state in which the sender reduces the data transmission rate.

Figure 9:
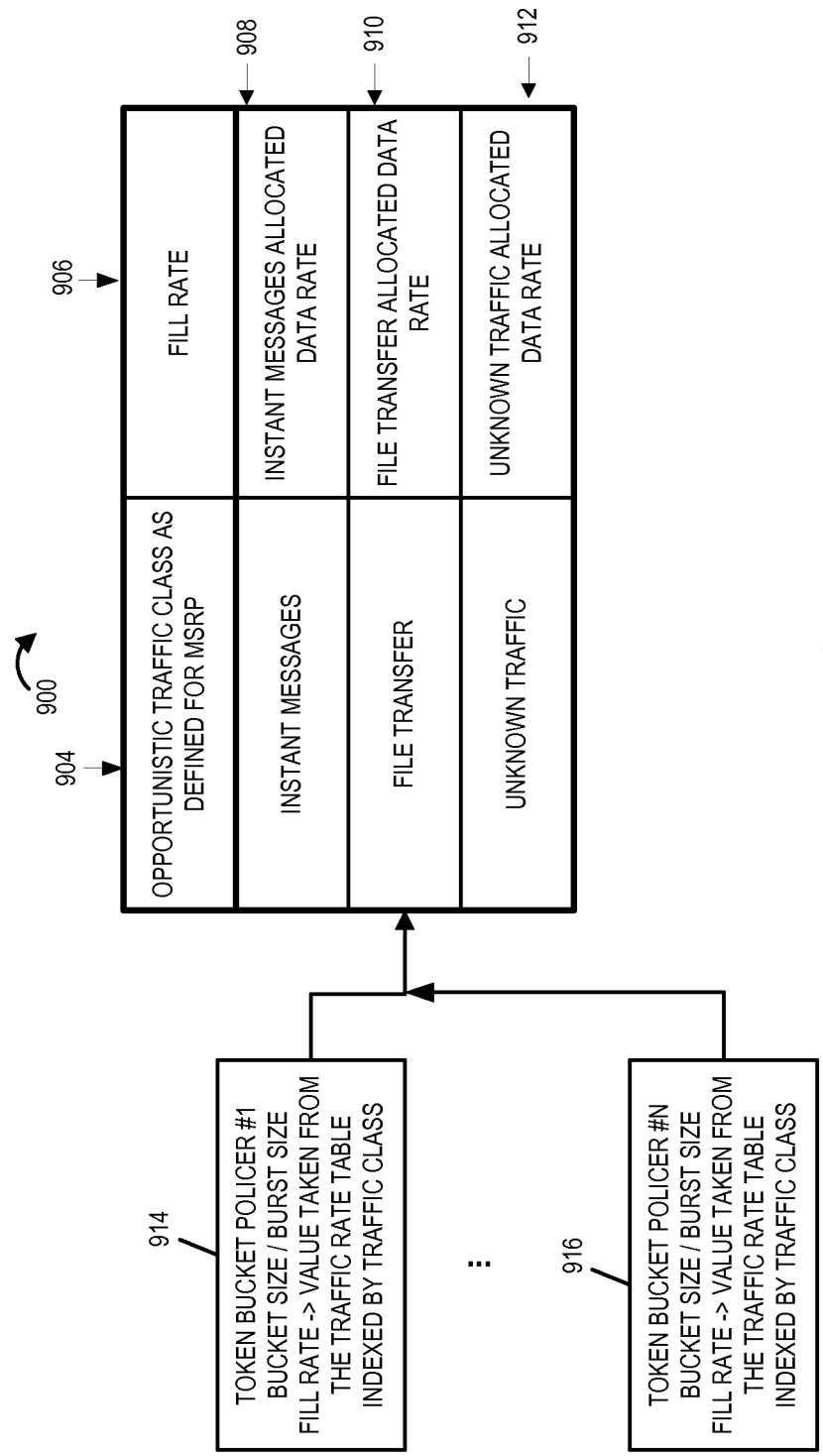
FIG. 9 illustrates an exemplary token bucket fill rate table in accordance with one embodiment of the present invention.

As described in the example above, the fill rate assigned to a per connection/flow token bucket policer is based on the bandwidth allocated to the corresponding TCP connection/flow. As new real time streams and new TCP connections for opportunistic rate traffic are admitted and existing real time streams/data flows and TCP connections are terminated, bandwidth allocated to each of the remaining connections for opportunistic rate traffic gets modified. This is a modification of the bandwidth allocation which is typically performed by the bandwidth allocation manager module 608. This requires updating the fill rate of the per connection token policers, e.g., policer modules 614 and 616. When the number of such connections is large, updating the fill rate of each one of these policers can be computationally intensive. In some embodiments of the present invention, instead of maintaining the fill rate on a per token bucket policer basis, the fill rate is read from a global table stored in memory. The memory may be, and in some embodiments of the present invention is, located in the data/information section 142 of SBC-1 108 memory 138. In some embodiments, the table stores allocated data rates for different classes of traffic carried on MSRP connections. The allocated rates get adjusted in this table based on the available bandwidth for opportunistic rate traffic and the current number of TCP connections. After an adjustment, the new rate takes effect immediately for all flows in that traffic class. One advantage of this method is that the amount of CPU cycles required to update the table is minimal. Table 900 of FIG. 9 illustrates an exemplary token bucket fill rate table in accordance with one embodiment of the present invention.

Column 904 of table 900 lists information identifying exemplary opportunistic rate traffic classes as defined for MSRP messages and column 906 lists the corresponding fill rate for each class. Each row 908, 910 and 912 correlates a specific opportunistic rate traffic class identified and listed in column 904 with a corresponding fill rate identified and listed in column 906. For example, information contained in the table at column 906, row 908 provides the token bucket fill rate for MSRP instant messages data packet flows described in the example as INSTANT MESSAGES ALLOCATED DATA RATE. The information contained in the table at column 906, row 910 is the fill rate for MSRP file transfer data packet flows described in the table as FILE TRANSFER ALLOCATED DATA RATE. Similarly, the information contained in column 906 row 912 of table 900 provides the fill rate for MSRP traffic of unknown classification which is described as UNKNOWN TRAFFIC ALLOCATED DATA RATE. MSRP traffic of unknown classification will in some embodiments of the present invention be set at a default value by the bandwidth allocation manager module. Token bucket policer module 1 914 through token bucket policer module N 916 accesses the MSRP opportunistic rate traffic rate table 900 which is indexed by traffic class to obtain bucket size/burst size fill rates to use in policing opportunistic rate data packet flows. The token bucket policer modules will use the unknown traffic allocated data rate for packet flows it is either unable to classify or for which no separate classification is listed in the table.

In some embodiments of the present invention, after satisfying bandwidth requirements for control and signaling, real time packet flows, and slack bandwidth for newly allocated real time packet flows all the remaining bandwidth is made available for opportunistic rate packet flows such as MSRP messaging. In one aspect of the present invention, if the offered aggregate load of the opportunistic rate packet flows, e.g., MSRP packet flows, is less than the available bandwidth, then all opportunistic rate packet flows are permitted by the aggregate policing and all of the packets are served. In some embodiments, if the offered aggregate load of the opportunistic rate packet flows, e.g., MSRP packet flows, are more than the available bandwidth, then some of the packets are discarded by the aggregate policing. Also, if the aggregate allocation for opportunistic rate packet flows, e.g., MSRP packet flows, becomes greater than the available bandwidth, then each flow's allocation (i.e. flow policer) is throttled by an equivalent percentage such that the resulting aggregate allocation is within the bandwidth available for opportunistic rate packet flows, e.g., MSRP packet flows.

Various embodiments of the present invention allow opportunistic rate traffic, e.g., unspecified rate packet flows, to be handled alongside real time traffic while preventing the former from having an adverse affect on the QoS of the latter. Additionally, some embodiments of the present invention enforce fairness and/or other desired control on the relative QoS delivered to different opportunistic rate data session, e.g., MSRP sessions.

Figure 10:
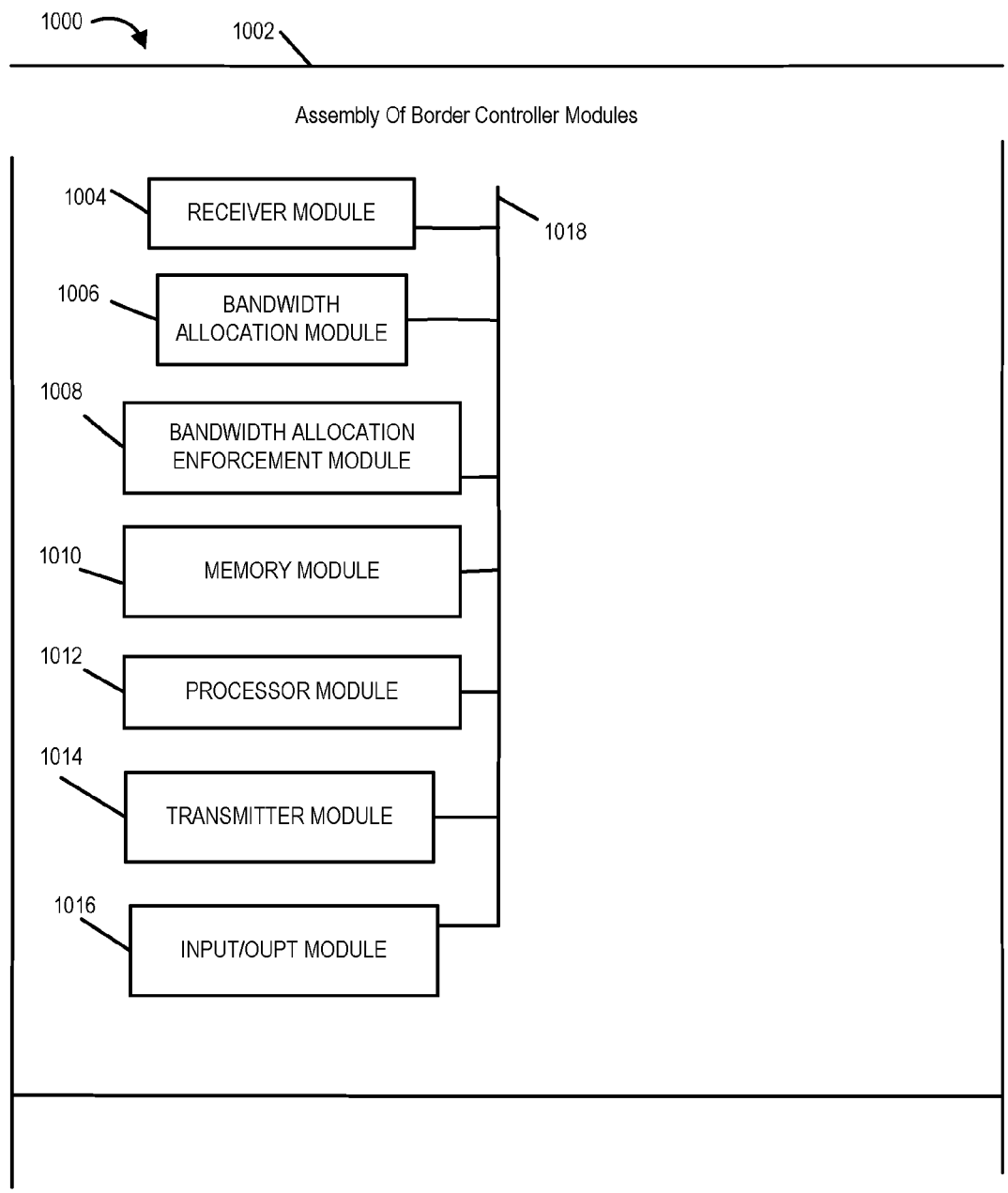
FIG. 10 illustrates an exemplary border controller module in accordance with one embodiment of the present invention.

Diagram 1000 of FIG. 10 illustrates an exemplary border controller 1002 that may be, and in some embodiments is, used in accordance with the present invention. The border controller 1002 may, and in some embodiments does, include an assembly of modules including one or more, and in some embodiments all, of the following modules: a receiver module 1004, a bandwidth allocation module 1006, a bandwidth allocation enforcement module 1008, a memory module 1010, a processor module 1012, a transmitter module 1014, and an input/output module 1016. In addition, the border controller 1002 may, and in some embodiments does, include a communication path 1018 such as a bus to which receiver module 1004, bandwidth allocation module 1006, bandwidth allocation enforcement module 1008, memory module 1010, processor module 1012, transmitter module 1014 and input/output module 1016 are connected and through which the modules can communicate with one another. The memory module 1010 includes memory such as for example a Random Access Memory (RAM) and/or a Read Only Memory (ROM). The memory module 1010 includes, in some embodiments, program instructions, e.g., executable code, bandwidth enforcement restrictions, procedure information and/or priority information, e.g, information priorities for different types of data, sessions, and/or flows. Memory 1010 also stores, messages, signaling information and/or other information. One or more of the modules of the border controller 1002 utilize the memory module 1010 to store data and information used or made accessible by the border controller or one or more of the modules of the border controller 1002.

The processor module 1012 includes one or more processors configured to process data and execute programming instructions. In some embodiments of the present invention the one or more processors of the processor module 1012 process data and/or requests in response to requests from one or more modules of the border controller 1002. The transmitter module 1014 is configured to transmit, among other things, flow control messages and/or signals from the border controller 1002 to one or more devices sending packets to the border controller. The input/output module 1016 may be, and in some embodiments, is configured to receive inputs to configure or modify the configuration of the border controller 1002 or the modules contained therein and to output information from the border controller 1002 including for example, the status of the border controller 1002, the packet flows and requests being received and/or outputted by the border controller 1002, the status of the border controller bandwidth allocation, etc.

In addition to the modules shown in FIG. 10, additional modules may be, and sometimes are, included in the boarder controller 1002. In one embodiment the border controller includes a module corresponding to each step of FIG. 5, e.g., one module per step. In one such embodiment, e.g., an embodiment where modules are implemented in hardware, the module corresponding to the step of FIG. 5 performs the function of the corresponding step. In another embodiment, e.g., an embodiment where modules are implemented in software and executed by a processor, the modules corresponding to steps control the session border controller to perform the step corresponding to the module. In still other embodiments where some modules are implemented in hardware and other modules are implemented as a combination of hardware and software or software, the modules either implement the step corresponding to the module or control the border controller to implement the step corresponding to the module. In at least some hardware embodiments, the modules are implemented as circuits.

In one exemplary embodiment of the present invention, the border controller 1002 of FIG. 10 includes the receiver module 1004 and the bandwidth allocation module 1006. The receiver module 1004 is configured to receive a bandwidth allocation request requesting allocation of a required amount of bandwidth (RRj) for a new real time packet flow (RTP flow j); the bandwidth allocation module 1006 is configured to allocate the requested bandwidth from bandwidth (Bslack) reserved for newly-allocated real time packet flows; and the bandwidth allocation module 1006 is also configured to generate new bandwidth allocations for existing opportunistic rate packet flows based on a measure of the total amount of bandwidth allocated to real time packet flows. In some but not all embodiments of the present invention, the bandwidth allocation module 1006 is further configured to update the measure of the total amount of bandwidth allocated to real time packet flows (BRalloc) to reflect the allocation of the bandwidth to the new real time packet flow.

In some embodiments of the present invention, the bandwidth allocation module 1006 is further configured to determine if the bandwidth required (RR$_j$) by said new real time packet flow plus bandwidth already allocated to real time packet flow (BRalloc) is less than or equal to a maximum real time packet flow bandwidth constraint (B$_{RMAX}$); and the step of allocating the requested bandwidth from bandwidth (Bslack) reserved for newly-allocated real time packet flows is performed by the bandwidth allocation module in response to determining that the bandwidth required (RR$_j$) by said new real time packet flow plus bandwidth already allocated to real time packet flows (BRalloc) is less than or equal to said maximum real time packet flow bandwidth constraint (B$_{RMAX}$).

In some embodiments of the present invention, the border controller 1002 includes the bandwidth allocation enforcement module 1008 configured to perform a bandwidth allocation enforcement procedure, following allocating the requested bandwidth to the new real time packet flow, to enforce said new bandwidth allocations for existing opportunistic rate packet flows. In some embodiments of the present invention, the bandwidth allocation enforcement module 1008 in performing the bandwidth allocation enforcement procedure frees up an amount of bandwidth corresponding to at least the amount of bandwidth allocated to said new real time packet flow; and wherein said bandwidth freed by enforcing the new bandwidth allocation for existing opportunistic rate packet flows restores the amount of reserved bandwidth available for newly-allocated real time packet flows to the amount available (Bslack) prior to allocating bandwidth to said new real time packet flow.

In some embodiments of the present invention, the bandwidth allocation module 1006 is further configured to determine an amount of bandwidth currently available for each existing opportunistic rate packet flow based on the total amount of bandwidth available for allocation to support real time and opportunistic rate packet flows excluding the amount of bandwidth allocated to real time packet flows (BRalloc) and the amount of the bandwidth reserved for newly-allocated real time packet flows (Bslack) divided by the number (N$_O$) of existing opportunistic rate packet flows. The receiver module 1004 of this border controller 1002 is further configured to receive a bandwidth allocation request for a new opportunistic rate packet flow, said new opportunistic rate packet flow having a minimum (lower bound) bandwidth requirement; and wherein said bandwidth allocation module 1006 is further configured to determine if the amount of bandwidth currently available for opportunistic rate packet flows will not be sufficient to satisfy a sum of minimum bandwidth requirements of existing opportunistic rate packet flows plus the minimum bandwidth requirement of the new opportunistic rate packet flow. The border controller 1002 may, and in some embodiments does, have the bandwidth allocation module 1006 further configured to deny the bandwidth allocation request when it is determined that the amount of bandwidth currently available for opportunistic rate packet flows will not be sufficient to satisfy a sum of minimum bandwidth requirements of existing opportunistic rate packet flows plus the minimum bandwidth requirement of the new opportunistic rate packet flow.

In some embodiments of the present invention, the bandwidth allocation module 1006 is also configured to: determine an amount of bandwidth currently available for allocation to existing opportunistic rate packet flows based on the total amount of bandwidth available for allocation to support real time and opportunistic rate packet flows excluding the amount of bandwidth allocated to real time packet flows (BRalloc) and the amount of the bandwidth reserved for newly-allocated real time packet flows (Bslack); and to divide the amount of bandwidth currently available for allocation to existing opportunistic rate packet flows among the existing opportunistic rate packet flows.

In some embodiments of the present invention, the processor module 1012 of the border controller 1002 includes one or more processors configured to: receive a bandwidth allocation request requesting allocation of a required amount of bandwidth (RRj) for a new real time packet flow (RTP flow j); allocate the requested bandwidth from bandwidth (Bslack) reserved for newly-allocated real time packet flows; and generate new bandwidth allocations for existing opportunistic rate packet flows based on a measure of the total amount of bandwidth allocated to real time packet flows; and the memory module 1010 includes memory coupled through communication bus 1016 to at least one processor of the one or more processors.

In various embodiments system/apparatus elements described herein are implemented using one or more modules which are used to perform the steps and/or sub-steps corresponding to one or more methods of the present invention. Each step may be performed by one or more different software instructions executed by a computer processor, e.g., a central processing unit (CPU). In some embodiments the modules may be and are implemented in software. In some embodiments, the modules may be and are implemented as servers. In some embodiments the modules may be, and are implemented in hardware, e.g., as circuits. In some embodiments the modules may be, and are, implemented in a combination of hardware and software.

It should be appreciated that numerous variations and embodiments are possible. In some systems the amount of bandwidth reserved for real time traffic flows may be a function of the number of flows which can be expected to be added during the time rate control which is applied to opportunistic flows is likely to take to be effective. In some embodiments the bandwidth reserved for real time traffic flows is a fraction of the amount of bandwidth which is made available for allocation to real time traffic flows, e.g., 5% or less the size of the amount of bandwidth made available for allocation to real time traffic flows.

In various embodiments a device of any of one or more of Figures includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., border controllers, telecommunications systems, network nodes and/or network equipment devices. Various embodiments are also directed to methods, e.g., method of controlling and/or operating border controllers, telecommunications systems, network nodes and/or network equipment devices. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, bandwidth management, data packet reception, packet policing, signal processing, and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., session border controller, including a processor configured to implement one, multiple or all of the steps of one or more methods of the invention.

In some embodiments, the processor or processors, e.g., CPUs, of one or more devices, e.g., communications nodes such as session border controllers are configured to perform the steps of the methods described as being performed by the communications nodes, e.g., session border controllers. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node such as a session border controller, with a processor which includes a module corresponding to each of the steps of the various described methods performed by the device in which the processor is included. In some but not all embodiments a device, e.g., communications node such as a session border controller, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a session border controller or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of sharing bandwidth over a link in a system that supports multiple types of traffic, the method comprising:
   receiving a bandwidth allocation request requesting allocation of a required amount of bandwidth for a new real time packet flow;
   allocating the requested bandwidth from bandwidth reserved for newly-allocated real time packet flows, said bandwidth reserved for newly-allocated real time packet flows being in addition to a maximum bandwidth allocatable for existing real time packet flows, said bandwidth reserved for newly-allocated real time packet flows not being accessible to opportunistic rate packet flows; and
   generating new bandwidth allocations for existing opportunistic rate packet flows based on a measure of the total amount of bandwidth allocated to real time packet flows, said generating new bandwidth allocation for existing opportunistic rate packet flows including:
      determining an amount of bandwidth currently available for allocation to existing opportunistic rate packet flows based on the total amount of bandwidth available for allocation to support real time and opportunistic rate packet flows excluding the amount of bandwidth allocated to real time packet flows and the amount of the bandwidth reserved for newly-allocated real time packet flows; and
      dividing the amount of bandwidth currently available for allocation to existing opportunistic rate packet flows among the existing opportunistic rate packet flows.

2. The method of claim 1, further comprising, prior to generating new bandwidth allocations for existing opportunistic rate packet flows:
   updating the measure of the total amount of bandwidth allocated to real time packet flows to reflect the allocation of the bandwidth to the new real time packet flow.

3. The method of claim 1, further comprising, prior to allocating the requested bandwidth from bandwidth reserved for newly-allocated real time packet flows:
   determining if the bandwidth required by said new real time packet flow plus bandwidth already allocated to real time packet flow is less than or equal to a maximum real time packet flow bandwidth constraint; and
   wherein said step of allocating the requested bandwidth from bandwidth reserved for newly-allocated real time packet flows is performed in response to determining that the bandwidth required by said new real time packet flow plus bandwidth already allocated to real time packet flows is less than or equal to said maximum real time packet flow bandwidth constraint.

4. The method of claim 1, further comprising:
   performing a bandwidth allocation enforcement procedure, following allocating the requested bandwidth to the new real time packet flow, to enforce said new bandwidth allocations for existing opportunistic rate packet flows.

5. The method of claim 4, wherein performing the bandwidth allocation enforcement procedure frees up at least an amount of bandwidth corresponding to the amount of bandwidth allocated to said new real time packet flow; and
   wherein said bandwidth freed by enforcing the new bandwidth allocation for existing opportunistic rate packet flows restores the amount of reserved bandwidth available for newly-allocated real time packet flows to the amount available prior to allocating bandwidth to said new real time packet flow.

6. The method of claim 1, further comprising:
   determining if the amount of bandwidth currently available for opportunistic rate packet flows will not be sufficient to satisfy a sum of minimum bandwidth requirements of existing opportunistic rate packet flows; and
   wherein the dividing the amount of bandwidth currently available for allocation to existing opportunistic rate packet flows further includes:
      allocating the bandwidth currently available for opportunistic rate packet flows to maximize the number of opportunistic rate packet flows having minimum bandwidth requirements that can be satisfied.

7. The method of claim 1, further comprising:
   assigning a priority to each currently existing opportunistic rate packet flow;
   determining if the amount of bandwidth currently available for opportunistic rate packet flows will not be sufficient to satisfy a sum of minimum bandwidth requirements of existing opportunistic rate packet flows; and
   wherein the dividing the amount of bandwidth currently available for allocation to existing opportunistic rate packet flows further includes:
      allocating the bandwidth currently available for opportunistic rate packet flows based on the priority assigned to the opportunistic rate packet flow.

8. A method of sharing bandwidth over a link in a system that supports multiple types of traffic, the method comprising:
   receiving a bandwidth allocation request requesting allocation of a required amount of bandwidth for a new real time packet flow;
   allocating the requested bandwidth from bandwidth reserved for newly-allocated real time packet flows, said bandwidth reserved for newly-allocated real time packet flows being in addition to a maximum bandwidth allocatable for existing real time packet flows, said bandwidth reserved for newly-allocated real time packet flows not being accessible to opportunistic rate packet flows; and
   generating new bandwidth allocations for existing opportunistic rate packet flows based on a measure of the total amount of bandwidth allocated to real time packet flows, said generating new bandwidth allocation for existing opportunistic rate packet flows includes:
      determining an amount of bandwidth currently available for each existing opportunistic rate packet flow based on the total amount of bandwidth available for allocation to support real time and opportunistic rate packet flows excluding the amount of bandwidth allocated to real time packet flows and the amount of the bandwidth reserved for newly-allocated real time packet flows divided by the number of existing opportunistic rate packet flows.

9. The method of claim 8, further comprising:
receiving a bandwidth allocation request for a new opportunistic rate packet flow, said new opportunistic rate packet flow having a minimum bandwidth requirement; and
determining if the amount of bandwidth currently available for opportunistic rate packet flows will not be sufficient to satisfy a sum of minimum bandwidth requirements of existing opportunistic rate packet flows plus the minimum bandwidth requirement of the new opportunistic rate packet flow.

10. The method of claim 9, further comprising:
when the amount of bandwidth currently available for opportunistic rate packet flows is sufficient to satisfy a sum of minimum bandwidth requirements of existing opportunistic rate packet flows plus the minimum bandwidth requirement of the new opportunistic rate packet flow:
determining new bandwidth allocations for existing opportunistic rate packet flows, said new bandwidth allocations being a function of the number of opportunistic rate packet flows which will exist after allocation of bandwidth to said new opportunistic rate packet flow and the amount of bandwidth currently available for opportunistic rate packet flows; and
allocating bandwidth to said new opportunistic rate packet flow.

11. The method of claim 10, further comprising:
enforcing said new bandwidth allocations for existing opportunistic rate packet flows and said new opportunistic rate packet flow.

12. The method of claim 11, wherein enforcing said new bandwidth allocations for existing opportunistic rate packet flows and said new opportunistic rate packet flow includes:
allowing one or more individual opportunistic rate packet flows to exceed their allocated bandwidth while the total bandwidth used by said opportunistic rate packet flows is below the total bandwidth currently available for use by opportunistic rate packet flows.

13. A border controller comprising:
memory for storing processor instructions; and
a processor configured to control the border controller to:
receive a bandwidth allocation request requesting allocation of a required amount of bandwidth (RRj) for a new real time packet flow (RTP flow j);
allocate the requested bandwidth from bandwidth (Bslack) reserved for newly-allocated real time packet flows, said bandwidth reserved for newly-allocated real time packet flows being in addition to a maximum bandwidth allocatable for existing real time packet flows, said bandwidth reserved for newly-allocated real time packet flows not being accessible to opportunistic rate packet flows;
generate new bandwidth allocations for existing opportunistic rate packet flows based on a measure of the total amount of bandwidth allocated to real time packet flows; and
determine an amount of bandwidth currently available for each existing opportunistic rate packet flow based on the total amount of bandwidth available for allocation to support real time and opportunistic rate packet flows excluding the amount of bandwidth allocated to real time packet flows (BRalloc) and the amount of the bandwidth reserved for newly-allocated real time packet flows (Bslack) divided by the number ($N_O$) of existing opportunistic rate packet flows.

14. The border controller of claim 13, wherein said processor is further configured to:
update the measure of the total amount of bandwidth allocated to real time packet flows (BRalloc) to reflect the allocation of the bandwidth to the new real time packet flow.

15. The border controller of claim 13, wherein said processor is further configured to:
determine if the bandwidth required ($RR_j$) by said new real time packet flow plus bandwidth already allocated to real time packet flow (BRalloc) is less than or equal to a maximum real time packet flow bandwidth constraint ($B_{RMAX}$); and
wherein said processor control the border controller to allocate the requested bandwidth from bandwidth (Bslack) reserved for newly-allocated real time packet flows in response to determining that the bandwidth required ($RR_j$) by said new real time packet flow plus bandwidth already allocated to real time packet flows (BRalloc) is less than or equal to said maximum real time packet flow bandwidth constraint ($B_{RMAX}$).

16. The border controller of claim 13, wherein said processor is further configured to:
perform a bandwidth allocation enforcement procedure, following allocation of the requested bandwidth to the new real time packet flow, to enforce said new bandwidth allocations for existing opportunistic rate packet flows.

17. The border controller of claim 16, wherein performing the bandwidth allocation enforcement procedure frees up an amount of bandwidth corresponding to at least the amount of bandwidth allocated to said new real time packet flow; and
wherein said bandwidth freed by enforcing the new bandwidth allocation for existing opportunistic rate packet flows restores the amount of reserved bandwidth available for newly-allocated real time packet flows to the amount available (Bslack) prior to allocating bandwidth to said new real time packet flow.

18. A computer program product for use in a border controller, the computer program product comprising:
a non-transitory computer readable medium comprising:
code for causing at least one computer to receive a bandwidth allocation request requesting allocation of a required amount of bandwidth (RRj) for a new real time packet flow (RTP flow j);
code for causing said at least one computer to allocate the requested bandwidth from bandwidth (Bslack) reserved for newly-allocated real time packet flows, said bandwidth reserved for newly-allocated real time packet flows being in addition to a maximum bandwidth allocatable for existing real time packet flows, said bandwidth reserved for newly-allocated real time packet flows not being accessible to opportunistic rate packet flows; and
code for causing said at least one computer to generate new bandwidth allocations for existing opportunistic rate packet flows based on a measure of the total amount of bandwidth allocated to real time packet flows, said code for causing said at least one computer to generate new bandwidth allocations for existing opportunistic rate packet flows including:

code for causing said at least one computer to determine an amount of bandwidth currently available for allocation to existing opportunistic rate packet flows based on the total amount of bandwidth available for allocation to support real time and opportunistic rate packet flows excluding the amount of bandwidth allocated to real time packet flows and the amount of the bandwidth reserved for newly-allocated real time packet flows; and code for causing said at least one computer to divide the amount of bandwidth currently available for allocation to existing opportunistic rate packet flows among the existing opportunistic rate packet flows.

* * * * *